United States Patent
Banzhaf et al.

(10) Patent No.: US 8,762,681 B2
(45) Date of Patent: *Jun. 24, 2014

(54) BLOCKED BASED END-TO-END DATA PROTECTION FOR EXTENDED COUNT KEY DATA (ECKD)

(75) Inventors: Gerhard Banzhaf, Nufringen (DE); Maor Ben-Dayan, Tel Aviv, IL (US); Kenneth W. Boyd, Tucson, AZ (US); Thomas Schlipf, Holzgerlingen (DE); Helmut H. Weber, Dettenhausen (DE)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/534,223

(22) Filed: Jun. 27, 2012

(65) Prior Publication Data

US 2013/0054918 A1    Feb. 28, 2013

Related U.S. Application Data

(63) Continuation of application No. 13/219,510, filed on Aug. 26, 2011, now Pat. No. 8,527,724.

(51) Int. Cl.
*G06F 12/02*     (2006.01)
*G06F 11/10*     (2006.01)

(52) U.S. Cl.
CPC ................. *G06F 11/1076* (2013.01)
USPC ........................................................ 711/201

(58) Field of Classification Search
CPC .................................................. G06F 11/1076
See application file for complete search history.

(56) References Cited

U.S. PATENT DOCUMENTS

| | | |
|---|---|---|
| 6,516,385 B1 | 2/2003 | Satoyama et al. |
| 6,697,866 B1 | 2/2004 | Arakawa et al. |
| 8,527,724 B2 * | 9/2013 | Banzhaf et al. ............... 711/163 |
| 2006/0129901 A1 | 6/2006 | Arataki et al. |
| 2009/0259456 A1 | 10/2009 | Amann et al. |
| 2009/0259924 A1 | 10/2009 | Amann et al. |
| 2010/0131773 A1 | 5/2010 | Cherian et al. |
| 2010/0191922 A1 | 7/2010 | Dickey et al. |

OTHER PUBLICATIONS

Dan Colegrove, "End-to-End DAta Protection," Hitatchi Global Storage Technologies White Paper WPEDP08EN-10, 2008, 3 pages, http://www.hitachigst.com/tech/techlib.nsf/ techdocs/ 328DB53FC65C4DF18625742C00562B92/$file/End-to-end_Data_Protection.pdf.

* cited by examiner

*Primary Examiner* — Hiep Nguyen
(74) *Attorney, Agent, or Firm* — Griffiths & Seaton PLLC

(57) ABSTRACT

For block based end-to-end data protection for extended count key data (ECKD) in a computing environment, information units (IU's) are aligned in a block boundary format. Block protection trailer data is added to each one of the IU's.

9 Claims, 19 Drawing Sheets

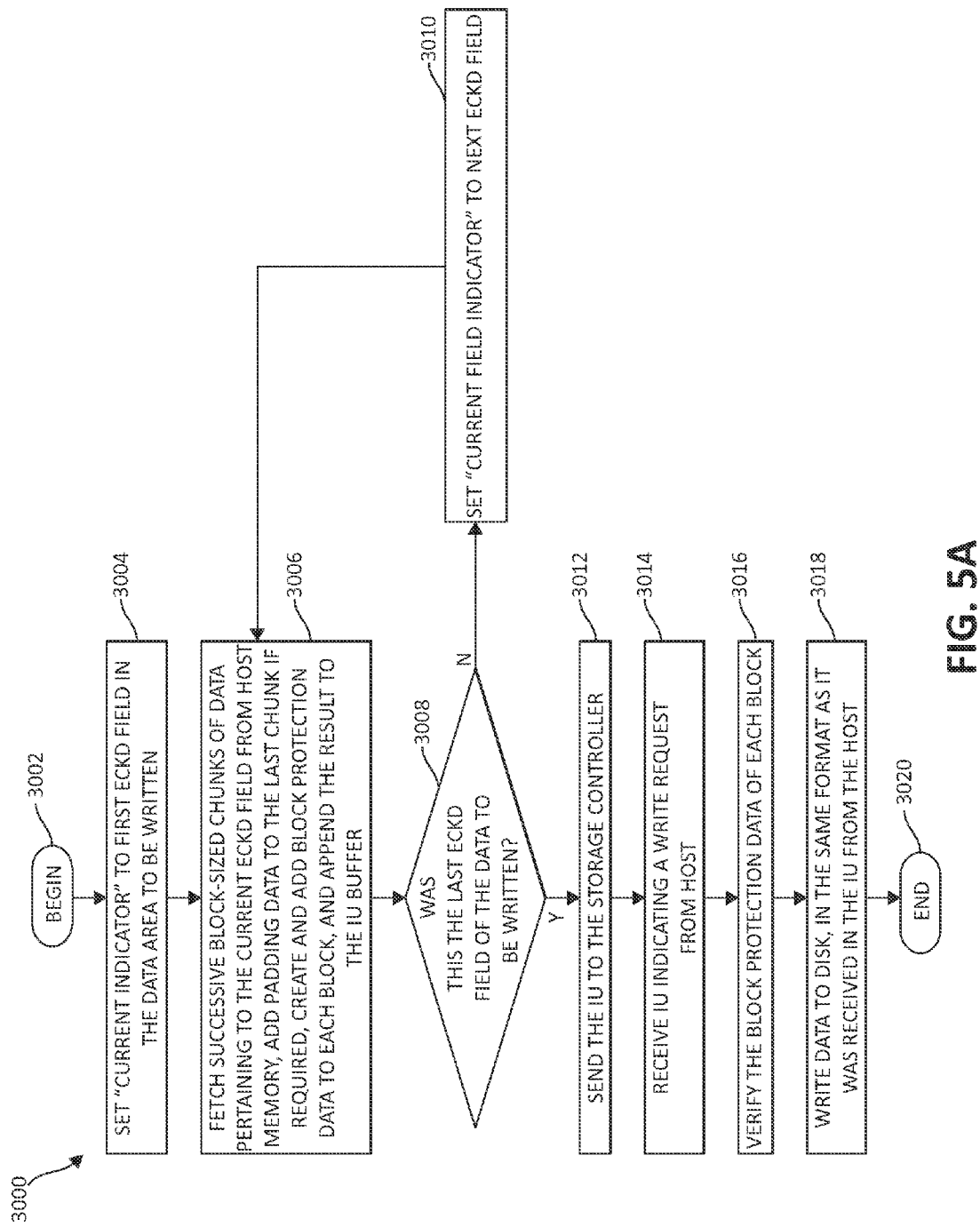

BLOCKED BASED END-TO-END DATA PROTECTION FOR EXTENDED COUNT KEY DATA (ECKD)

CROSS-REFERENCE TO RELATED APPLICATIONS

The present application is a Continuation of U.S. patent application Ser. No. 13/219,510, filed on Aug. 26, 2011.

BACKGROUND OF THE INVENTION

1. Field of the Invention

The present invention relates in general to computers, and more particularly to block based end-to-end data protection for extended count key data (ECKD) in a computing storage environment.

2. Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. In enterprise-class computing environments, data storage systems (or storage controllers) are often separated from the computer system, connected via a network (or storage network). The computer system that accesses such a data storage systems via the network is often called a server or a host.

In certain computing environments, data may be organized in ECKD (Extended Count Key Data) format. Data may be stored on volumes in a sequence of tracks, where each track contains one or multiple ECKD records. Each ECKD record consists of a fixed-length Count field, an optional, variable-length Key field, and a variable-length Data field. This ECKD format is also used when sending data from a server to a storage controller for the data to be written, or when data is sent from the storage controller to the server during a read operation. For the transfer between server and storage controller, the FICON or High Performance FICON (HPF) protocol may be used. Both are individual implementations of the Fibre Channel (FC) layer 4 protocol, as defined by the INCITS T11 committee, which is in charge of defining the Fibre Channel standards suite. Data entities defined by the ECKD protocol, which may be one or more ECKD records, individual fields of such records, or entire ECKD-format tracks, are transported between servers and storage controllers by means of the FICON or HPF protocol. FICON and HPF use the underlying Fibre Channel layers in the same way as other Fibre Channel protocols, such as the most widely used Fibre Channel Protocol for SCSI (FCP).

SUMMARY OF THE DESCRIBED EMBODIMENTS

As previously mentioned, the ECKD format may be used when sending data from a server to a storage controller for the data to be written or when data is sent from the storage controller to the server during a read operation. For the transfer between server and storage controller, the FICON or High Performance FICON (HPF) protocol may be used. ECKD data entities are embedded in FICON or HPF information units (IU's) in order to be transferred between a server and a storage controller. However, the current definitions of the FICON and HPF protocols are limited and may not be exploited to adopt and implement other standards, such as a T10-DIF standard for protecting the variable-length ECKD data, as the T10-DIF standard is a block-based end-to-end data protection, defined for I/O schemes based on fixed-length blocks. As a result, efficiency and productivity may be reduced.

Accordingly, and in view of the foregoing, various exemplary method, system, and computer program product embodiments for block based end-to-end data protection for extended count key data (ECKD) in a computing environment are provided. In one embodiment, by way of example only, information units (IU's) are aligned in a block boundary format. Block protection trailer data is added to each one of the IU's.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 5A is a flowchart illustrating an exemplary method for receiving a write request of extended count key data (ECKD) based upon the second implementation;

DETAILED DESCRIPTION OF THE DRAWINGS

Figure 1:
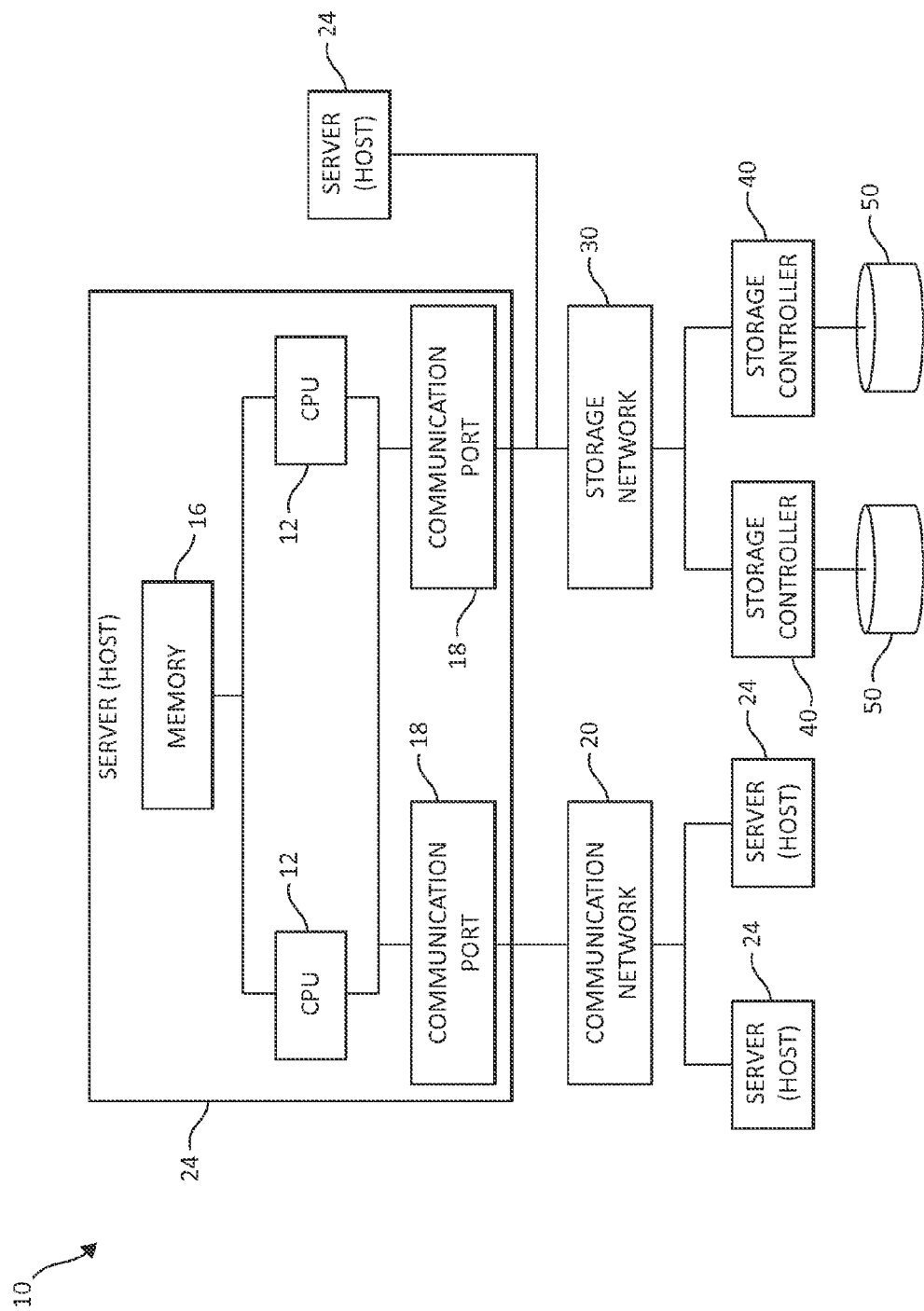
FIG. 1 illustrates a computing storage environment having an exemplary storage device in which aspects of the present invention may be realized.

On a System z mainframe, data is typically organized in ECKD (Extended Count Key Data) format. Data may be stored on volumes in a sequence of tracks, where each track contains one or multiple ECKD records. Each record consists of a fixed-length Count field, an optional, variable-length Key field, and a variable-length Data field.

This ECKD format may also be used when sending data from a server to a storage controller for the data to be written or when data is sent from the storage controller to the server during a read operation. For the transfer between a server and storage controller, fibre connection (FICON) or High Performance FICON (HPF) protocols may be used. (FICON is also the name of an I/O channel which was developed by IBM for the data storage requirements for mainframe computers, and which implements the FICON protocol.) Both FICON and HPF are individual implementations of the Fibre Channel (FC) layer 4 protocol, as defined by the INCITS T11 committee, which is in charge of defining the Fibre Channel standards suite. FICON and HPF use the underlying Fibre Channel layers in the same way as other Fibre Channel (FC) protocols, such as the most widely used Fibre Channel Protocol for SCSI (FCP).

With FC protocols, the data to be transmitted may be logically organized in Information Units (IUs), which are exchanged between server and storage controller by using facilities provided by lower FC layers. In case of ECKD data transmitted using the FICON or HPF protocols, an FC IU may contain one or multiple ECKD records and/or one or multiple fields of such records. The lower FC layers also provide protection against data corruption on a Fibre Channel link. However, because this protection information may be checked and possibly removed and regenerated by components in a storage area network (SAN) (e.g., by host bus adapters (HBAs) and Fibre Channel switches), the FICON and HPF protocols provide an additional end-to-end protection on FC layer 4 on an IU base. For this purpose, protection data may be added to each IU by the server, and checked and removed again by the storage controller in case of an outbound data transfer, and vice versa for inbound transfers. This scheme protects against data corruption that could be introduced by the above-mentioned SAN components. The protection information consists of a Cyclic Redundancy Check (CRC) field added to the end of each IU, which is calculated over all the data in the IU. Optionally, in case of an outbound transfer, there can also be intermediate cyclic redundancy check(s) (CRC), which protect individual pieces of the IU. This option can be used to protect individual ECKD records or fields in case that the IU contains multiple such records or fields. When used, a directory structure, which specifies the location of the CRC fields within the data stream, may be used and transmitted as meta-data, which is also part of the IU. Without this information, the receiving storage controller would not be able to distinguish between user and protection data, and therefore would not be able to accomplish the required checking of the intermediate CRCs.

In the distributed (non-mainframe) world, data may be organized in fixed-length blocks, where the block length is often 512 bytes, or a multiple of that, like 4K or 8K bytes. The same fixed-block format (e.g., data aligned on block boundary) may be used for the transmission of data between server and storage controller, and also for storing data on device media. The device media are organized in logical units (devices), addressed by a logical unit number (LUN), and the fixed-size blocks on such a logical unit are organized in a simple sequential order, where each block is addressed by a logical block address (LBA) in the range 0 up to some maximum integer number, depending on the size (storage capacity) of the logical unit.

Distributed systems (sometimes also called "open" systems), using the FCP flavor of the Fibre Channel suite, in the past have lacked support for end-to-end data protection, as described above for FICON and HPF. However, in recent years proprietary mechanisms tried to close this gap. Moreover, the INCITS T10 committee, which defines the SCSI standards suite, proposed a standard for end-to-end data protection by adding an 8-byte Data Integrity Field (DIF) to each data block. Thus, the length of a typical 512-byte block may be increased to 520 bytes. In reference to the ANSI committee T10 and the name of the protection data field (DIF), this protection mechanism became known as T10-DIF. The T10-DIF may be used to protect data-in-flight and to protect data-at-rest, which means in case of a write operation, the storage controller does not strip off the protection data and add proprietary protection data for storing data on the device media. Rather, the T10-DIF protection data is written with the user data to the device media. Accordingly, in case of a read, the user data, together with the protection data, is sent to the server again. Thus, the server receives the same protection data it had generated originally. T10 DIF still assumes that protection data is checked on the path between server and device media, such as in switches and in the storage controller. In particular, it is important that a storage controller checks data before it gets written to the media, to avoid that corrupted data gets written, and the corruption is detected only when the data is read back again, which might be at a much later point in time.

However, with ECKD data transmitted using the FICON and HPF protocols, these advancements in the distributed systems may not be utilized. IU-level protection data needs to be translated into storage controller specific protection data, even if the storage controller supports T10 DIF, although almost always, ECKD records are mapped to fixed-block when recorded on the device media.

In order to address the inefficiencies and performance issues previously described, the illustrated embodiments provide mechanisms for providing a protocol for block-based end-to-end data protection for variable-length ECKD data. The mechanisms, for example, align information units (IU's) in a block boundary format. A small computer system interface (SCSI) standard trailer with protection data is added to each of the blocks of the IU's.

The mechanisms align information units (IU's) in a block boundary format (e.g., fixed blocks). If necessary, the IU's may be independently aligned by adding padding data to the IU's. A small computer system interface (SCSI) standard trailer with protection data is added to each block of the IU's. At least one request is sent with the IU's to a storage controller. The request is at least a write request and/or a read request. In response to receiving the request by the storage controller, the IU's are stored on storage devices for the write request and the IU's are translated into a sequence of IU's for the read request. The SCSI standard trailer with the protection data is added to each block of each of the sequence of IU's.

Moreover, in one embodiment, the mechanisms change the FICON and HPF protocols to use the block-based T10-DIF protection scheme rather than the proprietary IU-based protection scheme. This means the block-based notion of storage organization, as it is applied to mainframe-type data on a storage controller, is propagated up to the server side. This is advantageous in particular when the storage controller uses the T10 DIF scheme to protect data-at-rest, so that the block-based T10 DIF protection data generated on the host and used for protection of data during the data transfer from the host to the storage controller (protection of data-in-flight) in some cases can be used to also protect the data stored on the device media, and again to protect the data during a subsequent data transfer from the storage controller to the host when it is read back again. The mechanisms provide for true end-to-end data protection, where the protection data created on the server is stored on the device media, together with the user data, and sent back to the server for verification on a subsequent read. Therefore, the costly transformation of FICON CRCs to T10-DIF CRCs and vice versa may be avoided. The mechanisms of the present invention further exploit the support for T10-DIF in SAN components (e.g., host bus adapter(s) (HBA) and Fibre Channel switches) for mainframe-type data.

In one embodiment, a T10 DIF trailer contains other fields (in addition to the guard field holding the CRC), which may be used to protect against lost or misplaced blocks. These fields may also be used for a similar type of protection for mainframe data.

Moreover, the mechanisms of the present invention help to ease building ECKD capable control units (e.g., including end-to-end (E2E) checking) and allow for a new ECKD control unit already using the same data format of the present invention for storage layout on its fixed-block disks to avoid a costly transformation between data-in-flight and data-at-rest protection data.

FIG. 1 illustrates a computing environment 10 having an exemplary storage device in which aspects of the present invention may be realized. The server 24 includes central processing unit (CPU) 12, which is connected to communication port 18 and memory device 16. The communication port 18 is in communication with a communication network 20 and/or a storage network 30. The communication network 20 and storage network 30 may be configured to be in communication with server (host) 24 and storage systems, which include storage controllers 40 and storage devices 50. The storage systems (e.g., storage devices 50) may include hard disk drive (HDD) devices, solid-state devices (SSD) etc., which can be configured in a redundant array of independent disks (RAID). The operations described below may be executed on device(s) 50, located in system 10 or elsewhere and may include separate memory devices 16 executed in conjunction with each other or independently to accomplish the purposes of the invention. Memory device 16 can include such memory as electrically erasable programmable read only memory (EEPROM) or a host of related devices. Memory device 16 and storage devices 50 are connected to CPU 12 via a signal-bearing medium. In addition, CPU 12 is connected through communication port 18 to a communication network 20, having an attached plurality of additional computer host systems 24.

It may be noted that the computer systems within computing storage environment 10 may be enterprise-class (or mainframe-type) systems. Within these systems, the mainframe may be referred to as the host or server 24, and may not include mass storage devices. Rather, the mass storage devices 50 may be managed by storage controllers 40, which are attached to the hosts using a storage network 30. Multiple hosts 24 and storage controllers 40 may be attached to a storage network 30, such that a host may access multiple storage controllers 40, and a storage controller 40 may be accessed by multiple hosts 24. The storage devices 50 may be integrated into the storage controller 40 and/or may be separate entities, again attached via some external point-to-point connection or storage network 30 (which may be attached and used to communicate from the storage controller 40 to the storage devices 50). There may be situations where the storage controller 40 and the storage devices 50 are physically integrated into the host and then there are communication networks 20 which interconnect multiple hosts.

Figure 2:
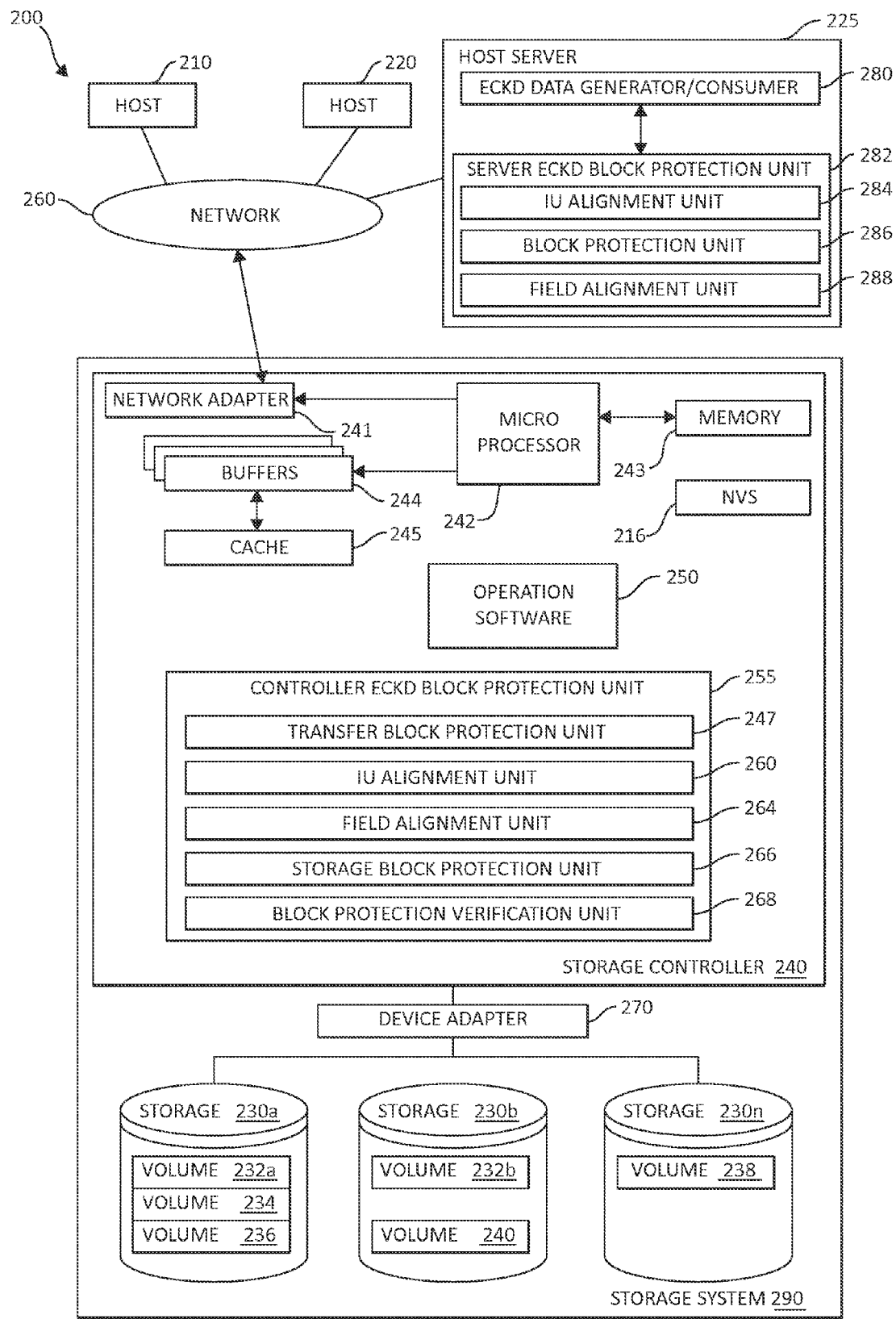
FIG. 2 is an exemplary block diagram showing a hardware structure of a host and a storage controller in a computing storage environment in which aspects of the present invention may be realized.

FIG. 2 is an exemplary block diagram 200 showing a hardware structure of a host and a storage controller in a computing storage environment in which aspects of the present invention may be realized. Referring to FIG. 2, there are shown host computers 210, 220, 225, each including a central processing unit for performing data processing as part of a computing storage environment 200. The hosts (physical or virtual servers), 210, 220, and 225 may be one or more new physical servers or virtual servers to accomplish the purposes of the present invention in the computing storage environment 200. A storage network connection 260 may be a fibre channel fabric, a fibre channel point to point link, a fibre channel arbitrated loop, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private network, or any combination thereof. The hosts 210, 220, and 225 may be local or distributed among one or more locations and may be equipped with any type of network adapter (or host bus adapter) (not shown in FIG. 2) to attach to the storage network 260 and communicate with the storage controller 240, such as Fibre channel, FICON, ESCON, Ethernet, fiber optic, wireless, or coaxial adapters. Storage controller 240 is accordingly equipped with a suitable network adapter or host bus adapter 241 to attach to the storage network 260 to communicate with the hosts 210, 220, and 225. The data storage system 290 within computing storage environment 200 is depicted in FIG. 1 comprising storage controller 240 and storage 230. In one embodiment, by way of example only, a storage controller 240 may be implemented as IBM® System Storage™ DS8000™.

To facilitate a clearer understanding of the mechanisms described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within computing storage environment 200. Storage 230 may be comprised of one or more storage devices, such as storage arrays, which are connected to storage controller 240 by a direct (point-to-point) connection, a storage network, or some other type of connection (such as a bus), or may be integrated in the storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the microprocessor 242 may access for executing functions and method steps associated with managing storage 230 and executing the steps and methods of the present invention for block based end-to-end data protection for extended count key data (ECKD) in a computing storage environment. In one embodiment, system memory 243 includes, is associated, or is in communication with the operation software 250 for block based end-to-end data protection for extended count key data (ECKD) in a computing storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory (NVS) and coupled to microprocessor 242 via a local bus (not shown in FIG. 2) for enhanced performance of the data storage system 290 within computing storage environment 200. The NVS 216 included in storage controller 240 is accessible by microprocessor 242 and serves to provide additional support for operations and execution of the present invention as described in other figures. The NVS 216 may also be referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such as a battery, supplies NVS 216 with sufficient power to retain the data stored therein in case of power loss to the data storage system 290 within computing storage environment 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," which may have different kinds of allocations. Storage 230a, 230b and 230n are shown as ranks in the data storage system 290 within computing storage environment 200 and are referred to herein as rank 230a, 230b and 230n. Ranks may be local to the data storage system 290 within computing storage environment 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and maybe a given rank.

The storage controller 240 may include a controller ECKD block protection unit 255. This controller ECKD block protection unit 255 may include a transfer block protection unit 247, an IU alignment unit 260, a field alignment unit 264, a storage block protection unit 266, and a block protection verification unit 268 to assist with block based end-to-end data protection for extended count key data (ECKD) in a computing storage environment. The controller ECKD block protection unit 255, as well as its subcomponents transfer block protection unit 247, IU alignment unit 260, field alignment unit 264, storage block protection unit 266, and block protection verification unit 268, may work in conjunction with each and every component of the storage controller 240, the hosts 210, 220, 225, and storage devices 230. The controller ECKD block protection unit 255 and its subcomponents, the transfer block protection unit 247, the IU alignment unit 260, the field alignment unit 264, the storage block protection unit 266, and the block protection verification unit 268, may be structurally one complete component working together and in conjunction for block based end-to-end data protection for extended count key data (ECKD) in a computing storage environment or may be individual components. The controller ECKD block protection unit 255 with its sub-components transfer block protection unit 247, IU alignment unit 260, field alignment unit 264, storage block protection unit 266, and block protection verification unit 268, may also be located in the cache 245 or other components of the storage controller 240 to accomplish the purposes of the present invention.

The storage controller 240 may be constructed with a network adapter (or host bus adapter) 241 for controlling the fiber channel protocol to the host computers 210, 220, 225, a microprocessor 242 for executing the instructions of the operation software 250, a memory 243, a non-volatile storage 216 for storing a microprogram (operation software) 250 for controlling the operation of storage controller 240, data for control and each table described later, cache 245 for temporarily storing (buffering) data, and buffers 244 for assisting the cache 245 to read and write data, a device adapter 270 for controlling a protocol to control data transfer to or from the storage devices 230, controller ECKD block protection unit 255 with its subcomponents transfer block protection unit 247, IU alignment unit 260, field alignment unit 264, storage block protection unit 266, and block protection verification unit 268. Multiple buffers 244 may be implemented with the present invention to assist with the block based end-to-end data protection for extended count key data (ECKD) in a computing storage environment. The microprocessor 242 may be configured to execute the multiple algorithms/operations, operation software 250 may be configured to define the algorithms/operation protocols, and the memory 243 may be configured for storing the data programs and the data program's data. The buffers 244 may be configured for transferring the data. The cache 245 and NVS 216 may be used as needed but are not essential to operations of the mechanisms described herein.

In one embodiment, by way of example only, the host computers or one or more physical or virtual servers 210, 220, 225 and the storage controller 240 are connected through a storage network (this could be a fiber channel) 260, also called a "fabric", which may include one or more network switches, directors, or other networking components. In one embodiment, by way of example only, the operation of the system shown in FIG. 2 will be described. The microprocessor 242 may control the memory 243 to store command information from the host server (physical or virtual) 210 and information for identifying the host server (physical or virtual) 210. The network adapter 241, the buffers 244, the cache 245, the operation software 250, the microprocessor 242, memory 243, NVS 216, and the ECKD block protection unit 255 with its subcomponents 247, 260, 264, 266, 268, and the device adapter 270 are in communication with each other and may be separate or one individual component(s). Also, several, if not all of the components, such as the operation software 250 may be included with the memory 243 for transferring extended count key data (ECKD) in a computing storage environment. Each of the components within the storage device may be linked together and may be in communication with each other for purposes suited to the present invention.

As previously mentioned, the illustrated embodiments provide mechanisms for block based end-to-end data protection for extended count key data (ECKD) within a computing storage environment. Protocols may be established for block-based end-to-end data protection for variable-length ECKD data. In one embodiment, information units (IU's) are aligned into a block boundary format. These information units (IU's) may contain one or more ECKD data fields and records. The block boundary format may be a fixed boundary format for the IU's. The IU's may contain ECKD data and control data (meta-data) and some or all of the mechanisms of the present invention may be performed on the control data in conjunction with the ECKD data or performed individually, if necessary. The ECKD data and the control data may be independently aligned as part of the information units (IU's) by adding padding data. The padding data may not be required in some cases. The padding data may be at the end of the IU's, and in addition at the end of a control data part or an ECKD data part within an IU. Block protection data (e.g., a small computer system interface (SCSI) standard trailer with protection data) may be added to each block of the IU's. The SCSI standard trailer with protection data may be the T10 DIF data and may be added to the end of each block of the IU's. A write and/or a read request may be sent with the IU's. If the request received (e.g., received by a storage controller) is a write request the ECKD data contained in the IU's may be stored on a storage device. The ECKD data contained in the IU's may be reassembled when they are stored on the device.

On the other hand, if the request is not a write request, a determination may be made to see if the request received (e.g., received by a storage controller) is a read request. If yes, the IU's may be translated into a sequence of IU's, which transfer the ECKD data read from the device to the server.

Figure 3A:
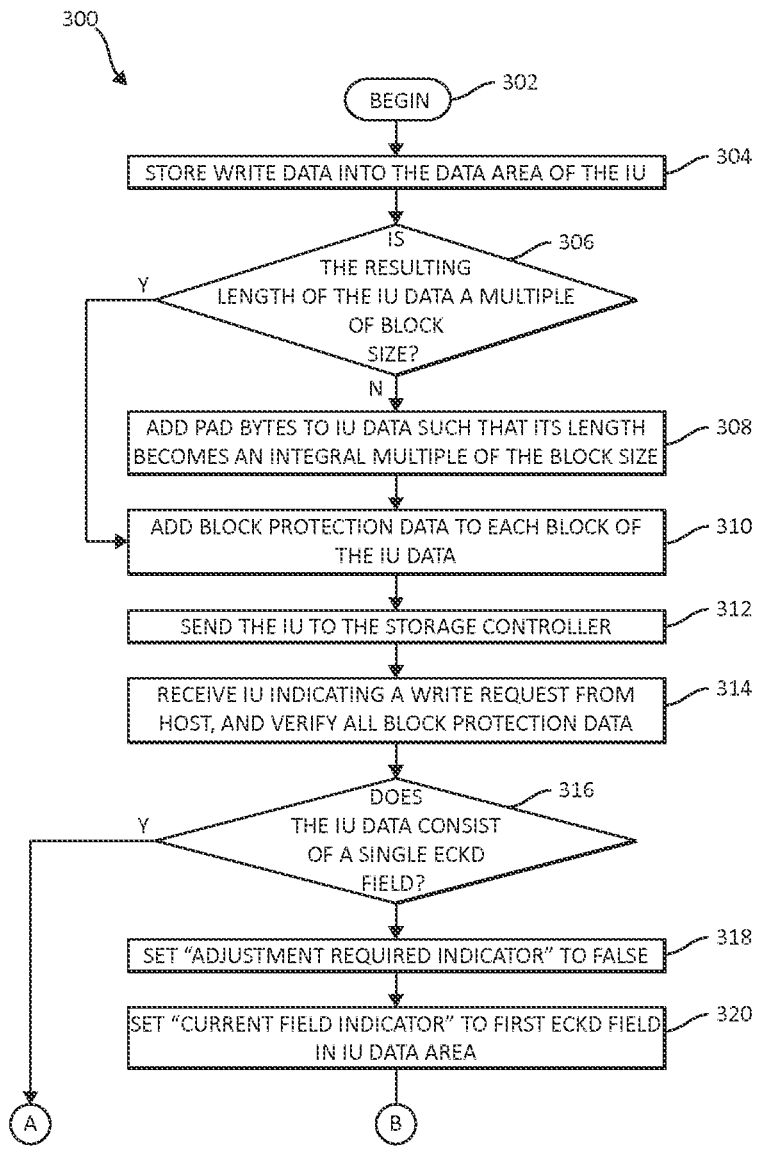
FIG. 3A-B is a flowchart illustrating an exemplary method for receiving a write request of extended count key data (ECKD) based upon the first implementation.
Figure 3B:
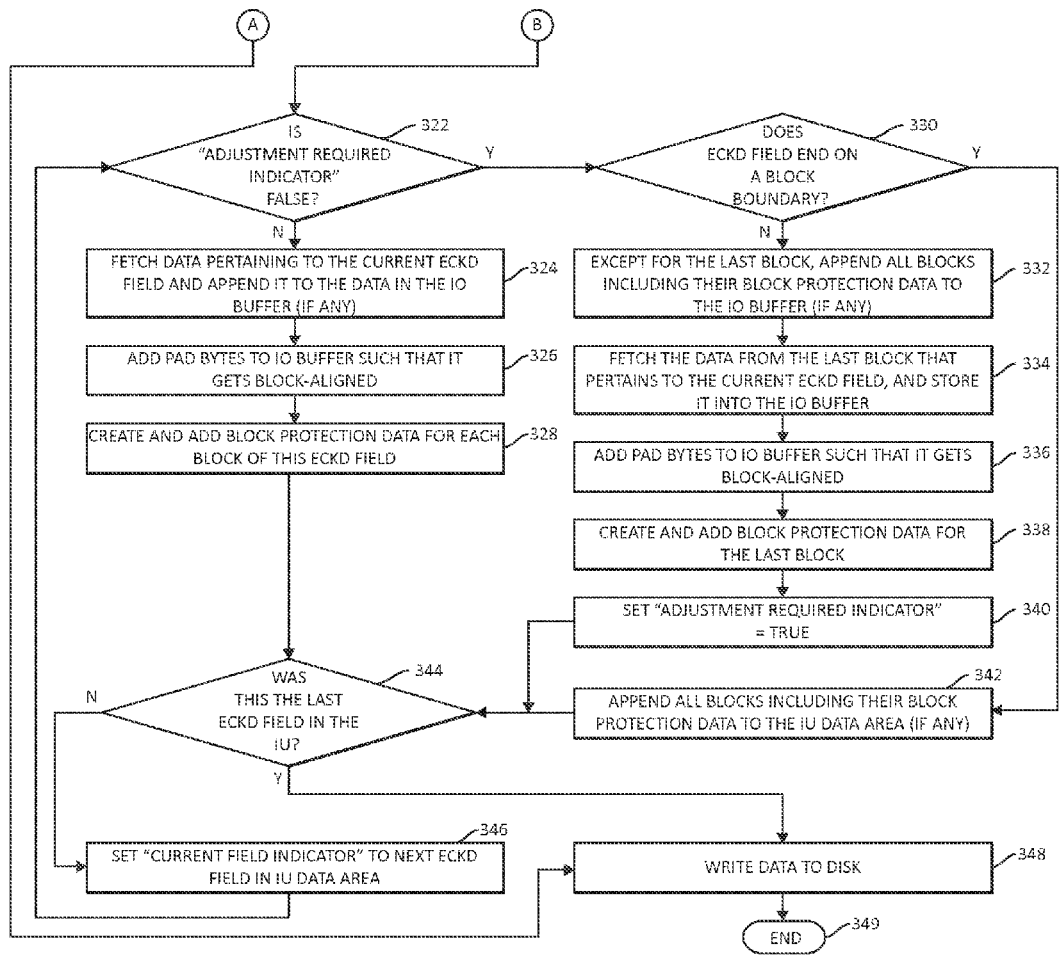

A SCSI standard trailer with the protection data may be transferred with each block of the sequence of the IU's. The ECKD data read from the device may be reassembled when they are put into the IU's in order to be transferred. It should also be noted that, in order for the SCSI standard trailers (e.g., the block protection data) to be added to the IU's, the data stream of an IU is logically chopped into block-sized chunks (e.g., chunks of 512 bytes). In the event that the last chunk is less than the block size, padding data is appended until the block size is reached. Then block protection data (such as the 8-byte T10 DIF trailer) is appended to each block. FIGS. 3A and 3B describe in more detail the processes for receiving a write request (FIG. 3A) and a read request (FIG. 3B) according the first implementation.

In one embodiment, the host may perform an alignment of the IU only (as compared to an alignment of each ECKD field contained in the IU), in which case the storage controller does the following. On a write request/operation, the mechanisms verify the block protection trailer of each block, strip off the block protection data trailer from each block and the padding data from the end of the IU, and rearrange the ECKD data such that each ECKD field is block-aligned by adding appropriate padding data to the end of each ECKD field, if required. The mechanisms may add a block protection trailer to each block of this new data structure, which is then stored on the storage medium.

On a read request/operation, the mechanisms verify the block protection trailer of each block of the data read from the storage medium, rearrange the data such that only the entire IU is block-aligned by removing the block protection data from each block of an ECKD field, remove the padding data from the end of each ECKD field, add new padding data to the end of the IU, add block protection data to each block of this new data structure, and send the IU to the host.

When the host does an alignment for each ECKD field, the storage controller performs the following. The mechanisms may perform on a write request/operation a verification of the block protection data of each block of the received IU and then store the data in the same format as received from the host, including the block protection data, on the storage medium.

On a read request/operation, the mechanisms may verify the block protection data of each block read from the storage medium, then put the data in the same format, including the block protection data into an IU, and send the IU to the host. To be more precise, in the first scenario, where the storage controller does the re-arrangement of the data, it is mandatory that it first verifies the protection data, both for reads and writes, before it strips off the protection data and creates new ones. In the second case, where no re-alignment occurs, this verification step may be optional.

FIG. 3A-B is a flowchart illustrating an exemplary method 300 for receiving a write request of extended count key data (ECKD) based upon the first implementation according to the mechanisms of the illustrated embodiments. The method 300 begins (step 302) by storing write data into the data area of an IU (step 304). The method 300 will determine if the resulting length of the IU data is a multiple of the block size (step 306). If no, the method 300 will add pad bytes to IU data such that the length becomes an integral multiple of the block size (step 308). If yes, step 308 is skipped. Now block protection data is added to each block of the IU data (step 310). The IU is sent to the storage controller (step 312). The method 300 will receive the IU indicating a write request from the host and verify all block protection data (step 314). Any errors may be sent for error notification handling purposes and the process may stop without storing the data and a notification may be sent to the host. The method 300 will determine if the IU data consists of a single ECKD field (step 316). If yes, the method 300 will write that data to a disk (step 348). If no, an "adjustment required indicator" is initialized to false (step 318). The "current field indicator" is set to a first ECKD field in the IU data area (step 320). Now the method 300 enters a loop over all ECKD fields in the IU. With the first operation in this loop, the method 300 checks if the "adjustment required indicator" is equal to false (step 322). If no, the method 300 will fetch data pertaining to the current ECKD field and append it to the data in the I/O buffer (if any) (step 324). Pad bytes are then added to the I/O buffer such that the ECKD field is block-aligned (step 326). Block protection data is created and added for each block of the ECKD field (step 328).

Returning to step 322, if the "adjustment required indicator" is (still) equal to false, the method 300 will determine if the ECKD field ends on a block boundary (step 330). If no, block protection data is generated for all blocks pertaining to this ECKD field except for the last block, and these blocks including their block protection data are appended to the data already in the I/O buffer (if any) (step 332). The data from the last block that pertains to the current ECKD field is fetched and stored into the I/O buffer (step 334). Pad bytes are added to this last block in the I/O buffer such that it is block-aligned (step 336). Block protection data is created and added for the last block (step 338). The "adjustment required indicator" is set to equal true (step 340).

Returning back to step 330, if the ECKD field does end on a block boundary (step 330), block protection data may be generated for each block (not shown), and all blocks including their block protection data are appended to the data already in the I/O buffer (if any) (step 342). Following both steps 328 and 342, the method 300 will check if the ECKD field is the last ECKD field in the IU (step 344). If no, the method 300 will set the "current field indicator" to the next ECKD field in the IU data area (step 346) and return to step 322. If yes, the method 300 will write the data to a disk (step 348) and the method 300 ends (step 349).

Figure 4A:
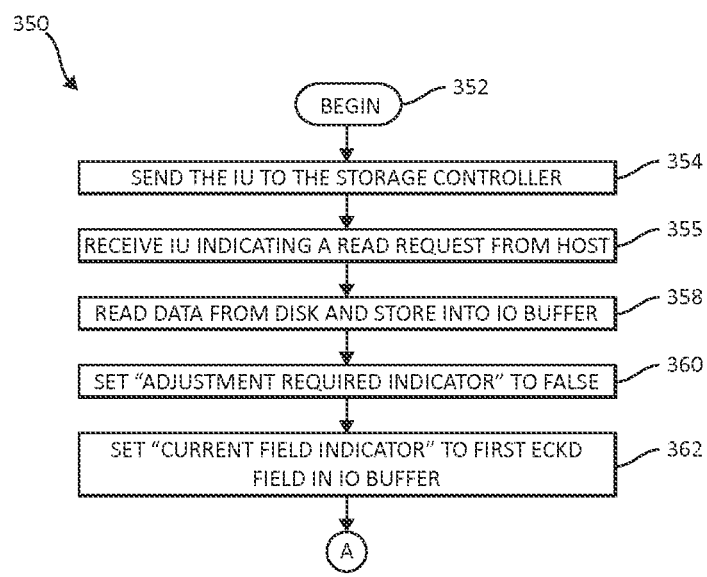
FIG. 4A-B is a flowchart illustrating an exemplary method for receiving a read request of extended count key data (ECKD) based upon the first implementation.
Figure 4B:
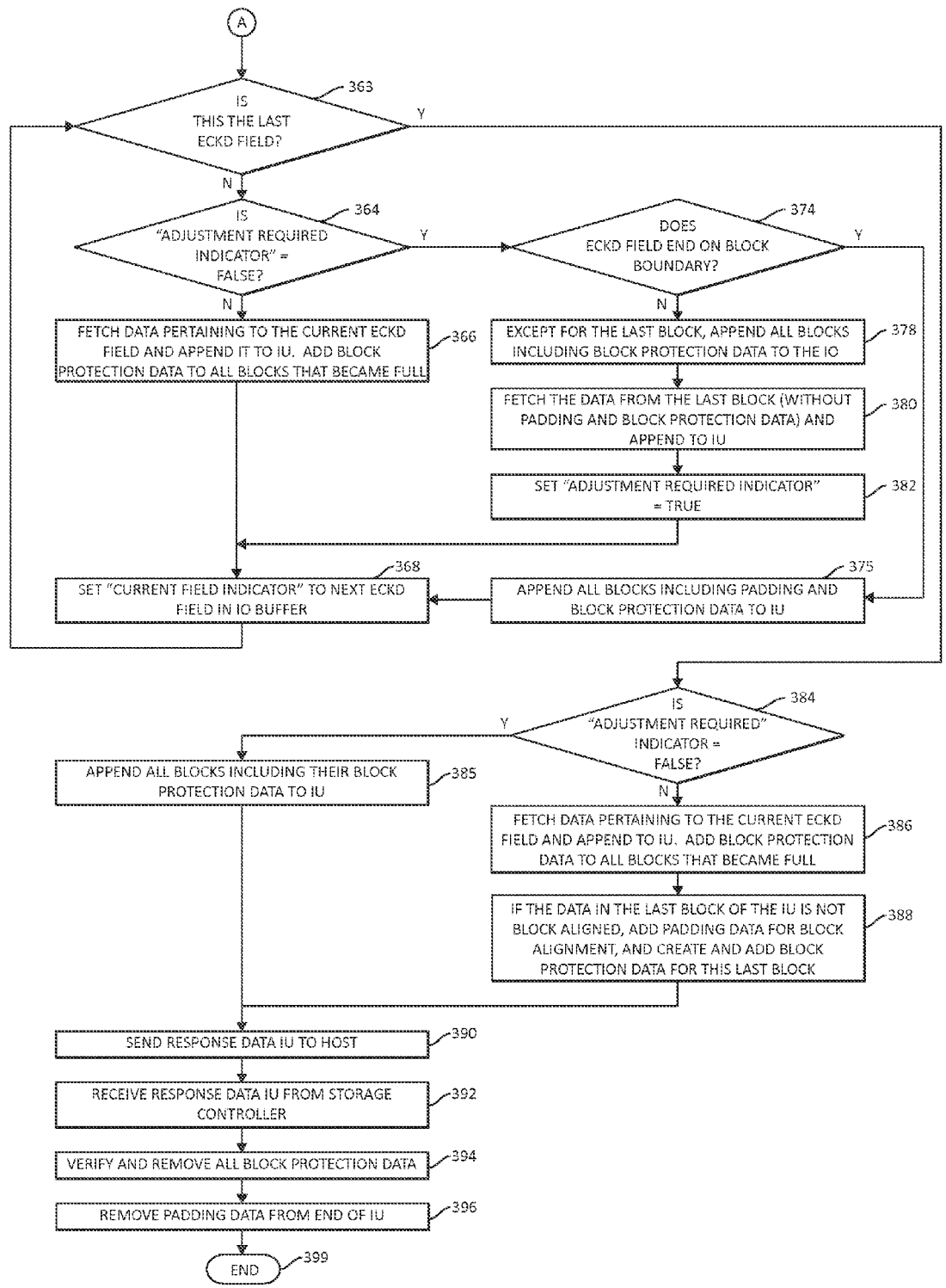

FIG. 4A-B is a flowchart illustrating an exemplary method 350 for receiving a read request of extended count key data (ECKD) based upon the first implementation according to the mechanisms of the illustrated embodiments. The method 350 begins (step 352) by sending the IU to a storage controller (step 354). The storage controller receives the IU indicating a read request from the host (step 355). The method 350 will read data from disk and first store it into an internal I/O buffer (step 358). The "adjustment required indicator" is initialized to false (step 360). The "current field indicator" is set to the first ECKD field in the I/O buffer (step 362). The method 350 now enters a loop over all the ECKD fields in the I/O buffer. As the first operation in this loop, it will determine if the current ECKD field is the last (or possibly only) field in the IO buffer (step 363). If not, it will determine if the "adjustment required indicator" is false (step 364). If yes (i.e., the indicator is still set to false), the method 350 will determine if the current ECKD field ends on a block boundary (step 374). If yes, the method 350 will append all blocks including padding data and the block protection data to the IU data area (step 375) and then move to step 368.

If the ECKD field does not end on a block boundary (step 374), all blocks except for the last block including block protection data is appended to the data already in the IU data area (step 378). The data part from the last block of this ECKD field in the IO buffer, but without padding data and block protection data, is also fetched and stored into the IU data area (step 380). Then the "adjustment required indicator" is set to true (step 382) and the method 350 moves to step 368.

Returning to step 364, if the "adjustment required indicator" is not false, the method 350 will fetch data pertaining to the current ECKD field (without any padding and block protection data) and append it to the data already in the IU buffer. Block protection data is created and added for each of the blocks in the IU buffer that became completely filled by this operation (step 366). Following steps 366, 375 and 382, the method 350 will now advance the "current field indicator" to the next ECKD field in the I/O buffer (step 368) and return to step 363.

Returning now to step 363, if this is the last (or only) ECKD field in the IO buffer, method 350 will also for this case determine if the "adjustment required" indicator is still false (step 384). If the "adjustment required indicator" is not false, the method 350 will fetch data pertaining to this last ECKD field (without any padding and block protection data) and append it to the data in the IU buffer. Also, block protection data is created and added for each of the blocks in the IU buffer that became completely filled by this operation (step 386). In case that the last block in the IU buffer is not yet completely filled with data, it will also add padding data to this last block for block alignment, and create and add block protection data also to this last block (step 388). Returning to step 384, if the adjustment required indicator is still set to false, the method 350 will append all blocks including padding data and the block protection data to the IU data area (step 385). Following both steps 385 and 388, the method 350 will now send the response data IU to the host (step 390). The method 350 now continues on the server side, where it will receive the response data IU from the storage controller (step 392). All block protection data is verified and removed (step 394). The method 350 will finally remove pad bytes from the end of the IU, if required (step 396). The method 350 ends (step 399).

In an alternative embodiment, the alignment may be performed with a first implementation for the meta-data (control data) part that is transferred with the user data (if any) and for the entire user data section of the IU, even if there are one or more ECKD records or fields. During a transfer of a single ECKD data field and/or record, the same protection data is used for data-in-flight and for data-at-rest. However, when the IU contains multiple ECKD records or fields, the storage controller may strip off the T10 DIF trailers from each block of the IU's it receives from the server and generate new T10 DIF trailers for the user data blocks that the storage controller writes to the device media (and vice versa for read operations).

FIG. 5A is a flowchart illustrating an exemplary method 3000 for receiving a write request of extended count key data (ECKD) based upon the second implementation according to the mechanisms of the illustrated embodiments. The method 3000 begins (step 3002) on the server side by setting the "current field indicator" to the first ECKD field in the data area to be written (step 3004). The method 3000 will fetch successive block-size chunks of data pertaining to the current ECKD field from the host memory, add padding data to the last chunk (block) if required, create block protection data for each block and add it to the end of each block, and append the result to an internal IU buffer (step 3006). The method 3000 will determine if the ECKD field is the last ECKD field of the data to be written (step 3008). If no, the "current field indicator" is set to the next ECKD field (step 3010) and returns to step 3006). If yes, the method 3000 will send the IU to the storage controller (step 3012). Method 3000 now continues on the storage controller side. The IU indicating a write request from the host is received (step 3014). The block protection data of each block is verified (step 3016). Any errors may be sent for error notification handling purposes and the process may stop without storing the data and a notification may be sent to the host. The method 3000 will write data to the disk in the same format as it was received in the IU from the host, including all block protection and ECKD field padding data (step 3018) and the method 3000 will then end (step 3020).

Figure 5B:
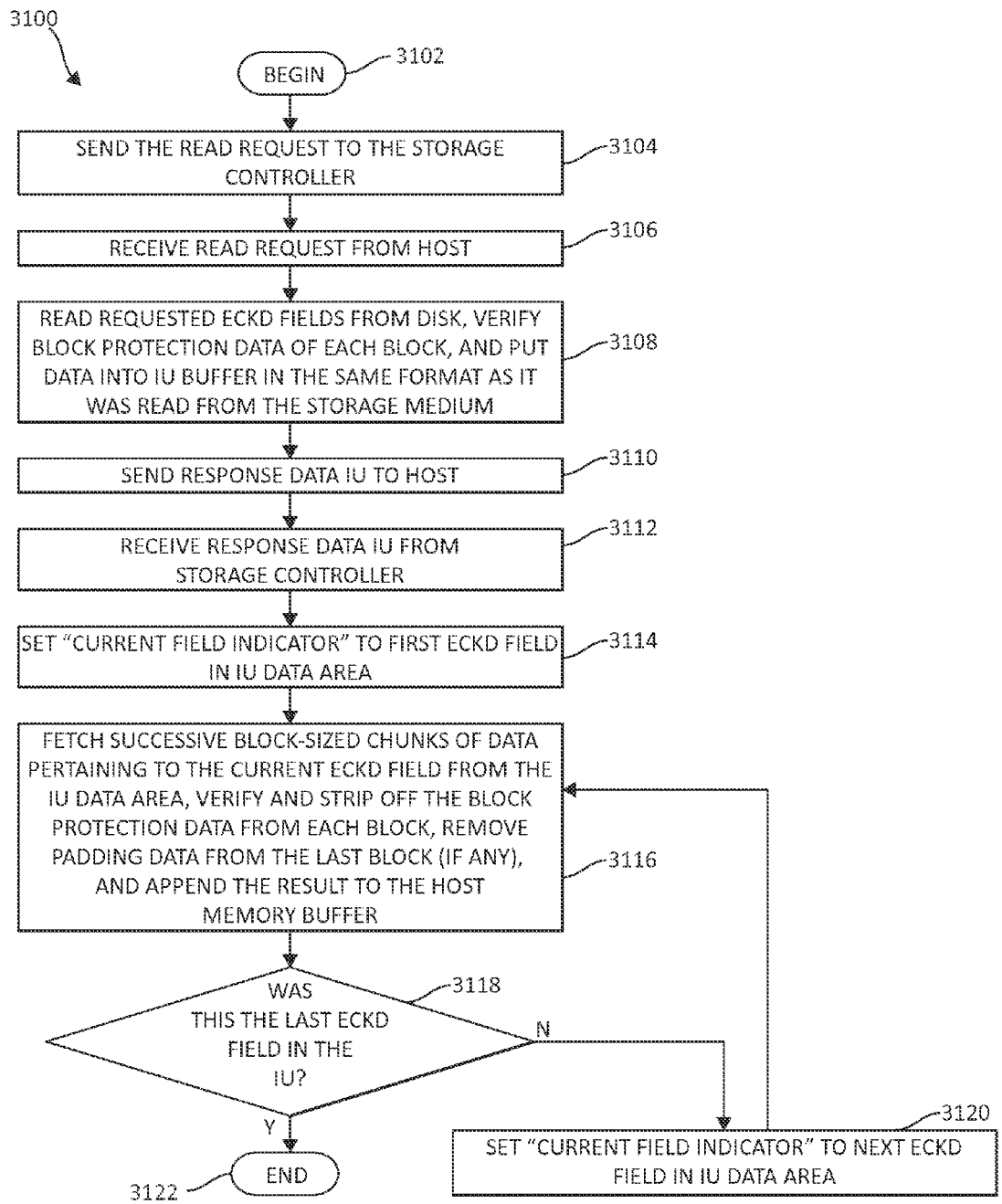
FIG. 5B is a flowchart illustrating an exemplary method for receiving a read request of extended count key data (ECKD) based upon the second implementation.

FIG. 5B is a flowchart illustrating an exemplary method 3100 for receiving a read request of extended count key data (ECKD) based upon the second implementation according to the mechanisms of the illustrated embodiments. The method 3100 begins (step 3102) on the server side by sending the read request to the storage controller (step 3104). Now continuing on the storage controller side, the read request is received from the host (step 3106). The method 3100 will read the requested ECKD fields from a disk, verify the block protection data of each block, and put the data into the IU buffer in the same format as it was read from the storage medium, including all block protection data and potential ECKD field padding data (step 3108). The response data IU is sent to the host (step 3110). Method 3100 now continues on the host side again. The response data IU is received from the storage controller (step 3112). The "current field indicator" is set to the first ECKD field in the IU data area (step 3114). The method 3100 will fetch successive block-size chunks of data pertaining to the current ECKD field from the IU data area, verify and strip off the block protection data from each block, remove padding data from the last block (if any), and append the result to the host memory buffer (step 3116). The method 3100 will determine if the ECKD field is the last ECKD field in the IU (step 3118). If no, the "current field indicator" is set to the next ECKD field in the IU data area (step 3120) and returns to step 3116. If yes, the method 3100 ends (step 3122).

In an alternative embodiment, the alignment is performed according to a second implementation for each ECKD field. A storage controller may use the same T10 DIF trailer for data-in-flight and for data-at-rest. However, a storage controller may still use a different scheme to record Count and Key fields in a more compact form, in which case protection data may need to be adjusted for these types of fields. From a performance perspective this is not critical, because Key fields are infrequently used and Count fields are often not accessed any more after a particular track of an ECKD volume has been formatted.

It should be noted that the methods described herein illustrate, by way of example only, situations where the data is transferred in a single IU, but the mechanisms of the illustrated embodiments may easily be extended and applied to situations and scenarios where the data that is to be transferred is distributed across a sequence of IU's, and/or where (in case of a write operation) the IU contains meta-data that is not written to the device.

Figure 6:
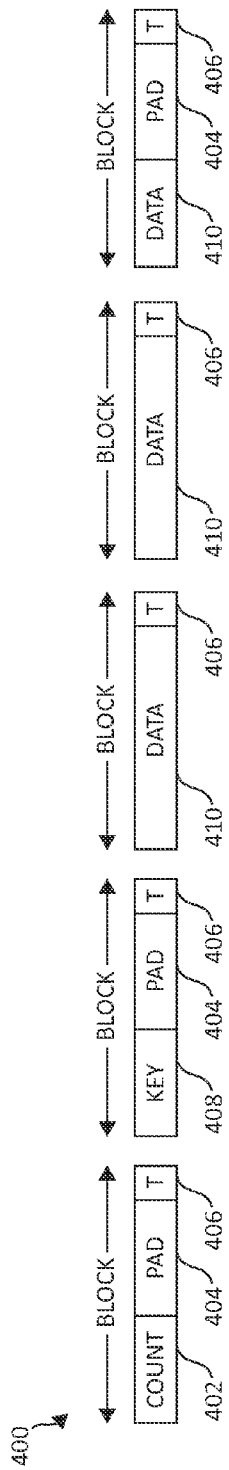
FIG. 6 illustrates an exemplary block diagram showing block-based end-to-end data protection for variable-length ECKD data.

As will be described below, in one embodiment the mechanisms seek to provide the ability for transferring variable-length extended count key data (ECKD) with block-based end-to-end data protection. FIG. 6 illustrates an exemplary block diagram 400 showing block-based end-to-end data protection for variable-length ECKD data, as it may be recorded on the storage medium, and also may be transferred between a host and a storage controller according to the second implementation. Block diagram 400 shows an ECKD record consisting of a Count field 402, a Key field 408, and a Data field 410. The Count field 402 and the Key field 408 are both smaller than the typical block length of 512 bytes. Each of these fields is stored in a separate block, with Pad data 404 added for block alignment. The size of the Data field 410 is such that it is larger than the size of 2 blocks, but smaller than 3 blocks. It is therefore distributed across three blocks, where again Pad data 404 is appended to the last one of these blocks. Finally, a data protection trailer 406 (indicated as "T") is appended to all blocks.

Figure 7:
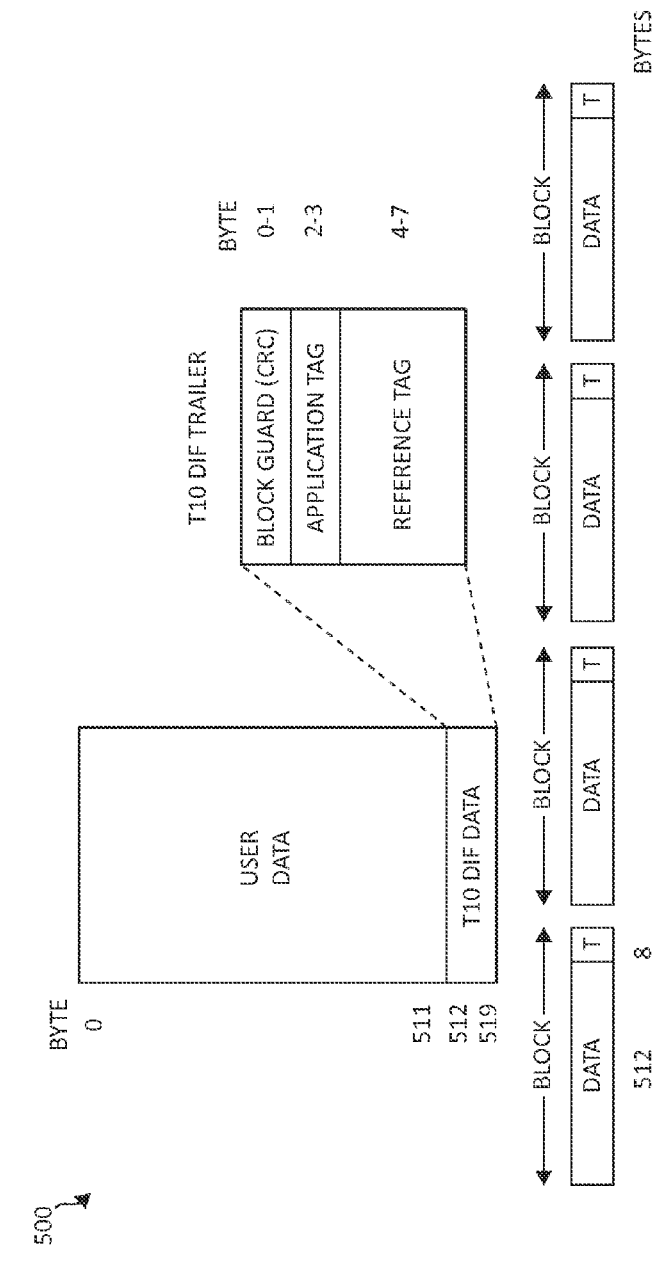
FIG. 7 illustrates an exemplary block diagram showing block-based end-to-end data protection for variable-length ECKD data with a small computer system interface (SCSI) standard data protection trailer.

Further illustrating the blocks with a data protection as depicted in FIG. 6, FIG. 7 illustrates an exemplary block diagram 500 showing block-based end-to-end data protection for variable-length ECKD data with a small computer system interface (SCSI) standard data protection trailer. In one embodiment, the mechanisms include ECKD data that is transmitted in fixed-block format (e.g., block boundary format) with a typical block size of 512 bytes, as similarly described in FIG. 6. Such format may be used for transferring and storing for SCSI data. The data protection trailer (indicated as "T") is added to each block of user data. Using the T10 DIF scheme defined in the INCITS SCSI standards, an 8-byte trailer may be added to each block. This increases the typical 512-byte block size to 520 bytes. The data protection trailer may include a block guard (CRC) in bytes 0-1, an application tag in bytes 2-3, and a reference tag in bytes 4-7 of the data protection trailer. (These bytes are used as examples and are not to be construed as limitations to the invention and may be altered, adjusted, or changed according to the purpose of the invention).

Figure 8:
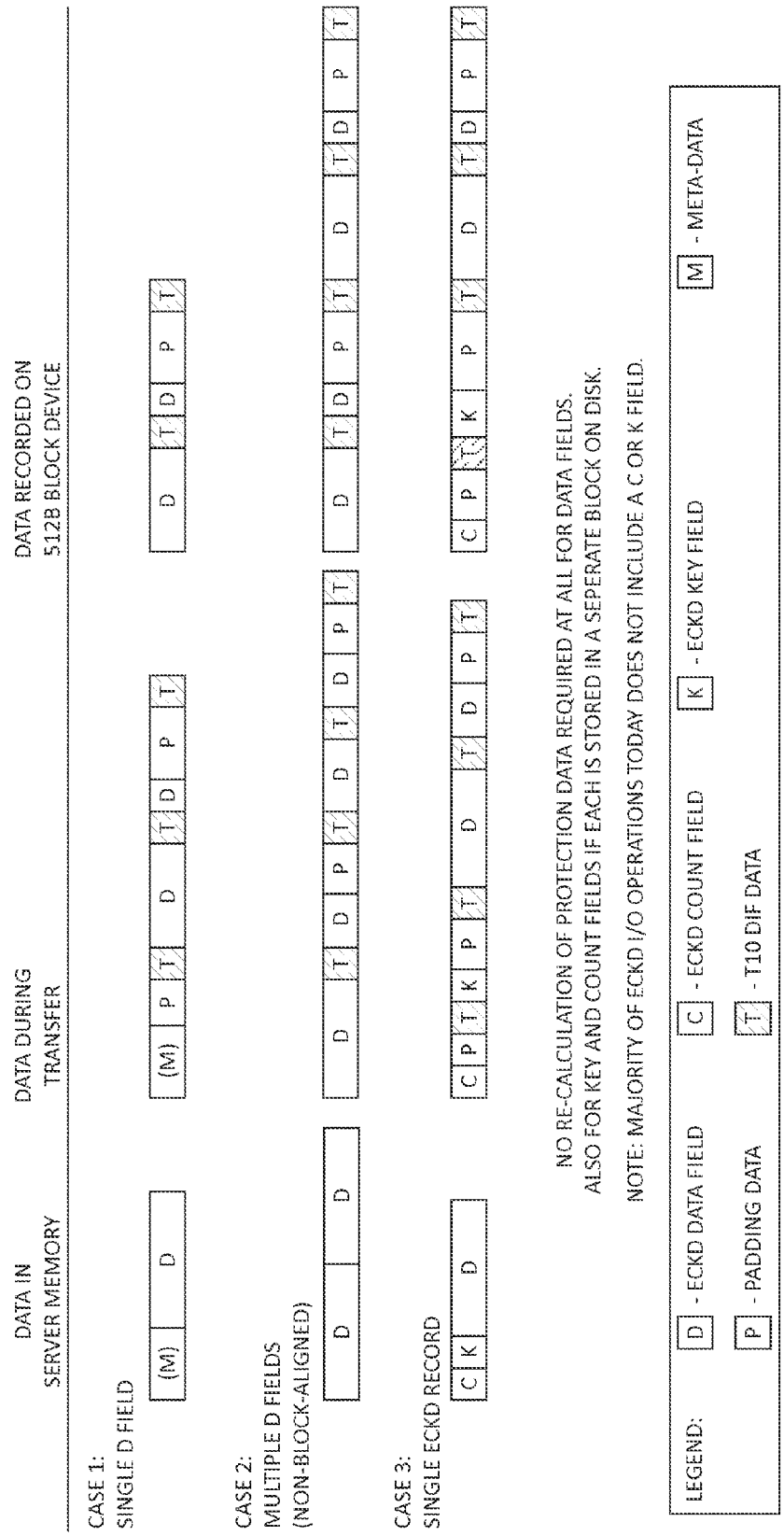
FIG. 8 illustrates an exemplary block diagram showing the transferring of extended count key data (ECKD) based upon the first implementation.

FIG. 8 illustrates an exemplary block diagram 800 showing the transferring of extended count key data (ECKD) based upon the first implementation. FIG. 8 illustrates three case scenarios; case 1: with a single data field of an ECKD record, case 2: with data fields for multiple ECKD records, and case 3: with an ECKD record containing a key, a count, and a data field. For each case, three separate stages are illustrated: data in server memory, data during transfer, and data recorded on a 520B block device, where each 512B data block is extended by an 8B T10-DIF trailer. In case 1, meta data (M) is aligned with the ECKD data (D) on a block boundary, as seen first during the data in the server memory. During the transferring of the ECKD data, padding data (P) is added to the end of the meta data (M) and the ECKD data (D) for block alignment, and T10 DIF data (T) is added to each of the blocks for the meta data (M) and the ECKD data (D). However, the meta data will be used for administrative purposes (e.g., used by the storage controller) and only the ECKD data (D) will be recorded on a media (storage) device. The ECKD data with padding data added will always start and end on the block boundary. The data recorded on the 520B block device now shows 2 blocks in which the data of the single ECKD data field are stored, and each of the blocks containing the data protection trailer. In this case, these are the same data protection trailer as were used during transfer. In case 2, multiple ECKD data fields are illustrated, as depicted in the server memory. No meta data field is shown in this case, as well as in case 3 below, although meta data could be part of these scenarios as well. In a general case, the first and the second ECKD data (D) field may be separated by a boundary within a block and the data protection trailer (T) may be added to each of the blocks during the transfer, where each block may contain data that belong to one or multiple ECKD data (D) fields. The first block contains data of the first ECKD data (D) field, and has data protection trailer (T) added to the block. The second block contains the remainder of the first ECKD data field, and the beginning of the second ECKD data field. Thus, these two ECKD data fields are not block-aligned. The data protection trailer is added to the end of this second block, and relates to data pertaining to two different ECKD data (D) fields. The last block contains the remainder of the second ECKD data (D) field plus padding data (P) and the data protection trailer (T). At the time of recording the data on a 520B block device, the first block contains data of the first ECKD data (D) field and the associated data protection trailer (T). The second block contains the remainder of the first ECKD data (D) field plus the padding data (P) and the data protection trailer (T). It should be noted that at the time of storage, the first block in storage contains the same portion of ECKD data and the same protection data that was originally created, while the other blocks contain different portions of ECKD data, padding data, and protection data that was recalculated. In case 3, during the data transfer, the count (C) (e.g., ECKD count field), key (K) (e.g., the ECKD key field), and a portion of the ECKD data (D) are contained in the first block and have the data protection trailer (T) added to entire block. The second block contains the remainder of the ECKD data (D) field, has the padding data (P) added at the end, and finally again data protection trailer (T). At the time of storage of data on the media (e.g., 520B block device), both the count (C) field and the Key (K) field are stored in separate blocks, have padding data added, and have recalculated data protection trailer (T) added to them. The first block that contains the first portion of the ECKD data (D) field (e.g., subsequent to the key field) also contains the recalculated data protection trailer (T), and the final block that contains the remainder of the ECKD data (D) field contains both the padding data (P) and the recalculated data protection trailer (T). As a general rule, no recalculation of protection data is required for data transfers of single ECKD data fields without associated count and key fields and/or multiple naturally block aligned ECKD-data-field-only transfers (which are more frequent scenarios). Also, this alignment process may be performed in the IU alignment unit (e.g., IU alignment unit in the server and/or controller) as described below in FIG. 10.

Figure 9:
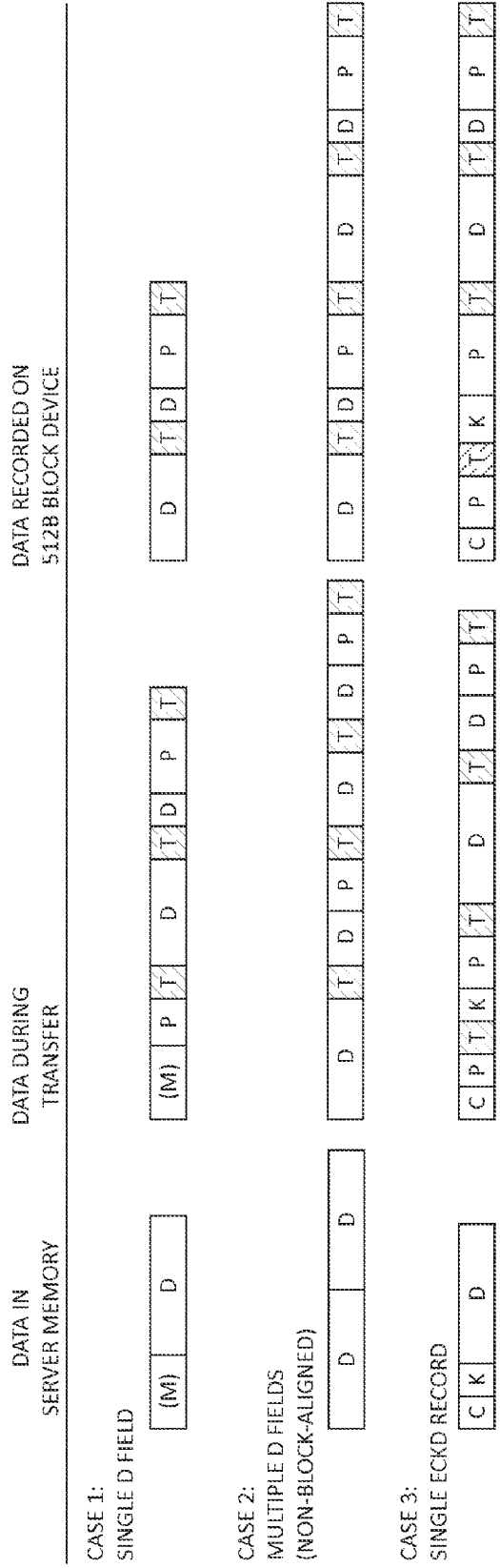
FIG. 9 illustrates an exemplary block diagram showing the transferring of extended count key data (ECKD) based upon the second implementation.
Figure 9:
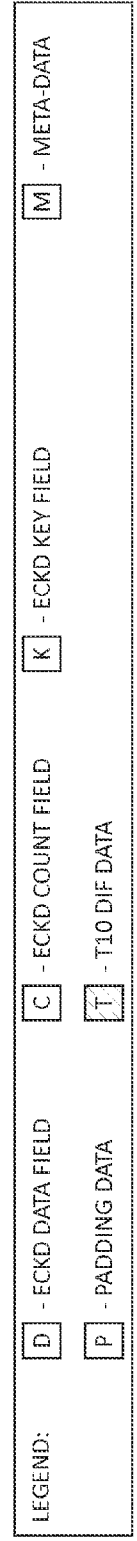

FIG. 9 illustrates an exemplary block diagram 900 showing the transferring of extended count key data (ECKD) based upon the second implementation. FIG. 9 illustrates three case scenarios; case 1: with a single data field of an ECKD record, case 2: with data fields for two ECKD records, and case 3: with a single ECKD record containing a key, a count, and a data field. For each case, three separate stages are illustrated: data in server memory, data during transfer, and data recorded on 512B block device. In case 1, meta data (M) is aligned with the ECKD data (D) on a block boundary, as seen first during the data in the server memory. During the transferring of the data, padding data (P) is added to the last block of the meta data, and T10 DIF data (T) is added to each of the blocks for the meta data (M). However, the meta data will be used for administrative purposes (e.g., used by the storage controller) and only the ECKD data (D) will be recorded on a media device. The ECKD data (D) now also starts on a block boundary. Padding data is again added to the end of the ECKD data (D) field, such that it also ends on a block boundary, and T10 DIF data (T) is added to each block of the ECKD data (D). The ECKD data recorded on the storage medium is identical to the ECKD data during transfer. The ECKD data is recorded on the 512B block device on 2 blocks, and each block contains the same portion of the ECKD data field, the same padding data (last block only), and the same data protection trailer as used during transfer. Case 1 is similar to the case 1 in FIG. 8.

In case 2, multiple ECKD data fields are illustrated, as seen in the server memory. No meta data field is shown in this case, as well as in case 3 below, although meta data could be part of these scenarios as well. As previously mentioned, the first and the second ECKD data (D) field in server memory may be separated by a boundary within a block. During the transfer, the first block contains the first portion of the first ECKD data (D) field and has data protection trailer (T) added to the block. The second block contains the remainder of the first ECKD data (D) field, and further contains padding data (P) followed by the data protection trailer (T). The third block contains the first portion of the second ECKD data (D) field and has the data protection trailer (T). The last block contains the remainder of the second ECKD data (D) field, and contains both the padding data (P) and the data protection trailer (T). Thus, each ECKD data field always starts on a block boundary, and no block ever contains pieces of two different ECKD data fields. At the time of recording the data on a 512B block device, the data is stored and recorded on the media in the same fashion as described for transferring the data. Also, each block pertains to a single ECKD data (D) field only, and each ECKD data field is aligned on an individual block basis. No recalculation of protection data is required for any of the data fields. As illustrated in FIG. 9, the transferring of extended count key data (ECKD) based upon the second implementation requires more padding data than required for the first implementation.

In case 3, during the data transfer, the first block contains the count (C) (e.g., ECKD count field), and the second block the key (K) (e.g., the ECKD key field), each with padding data (P) and data protection trailer (T) added to the block. The third block contains the first portion of the ECKD data (D) field with data protection trailer (T) added to the end of the block, and the last block contains the remainder of the ECKD data (D) field, with padding data (P) and data protection trailer (T) added at the end. Thus, each of the three different types of ECKD fields always starts on a block boundary, and no block ever contains pieces of two different ECKD fields. At the time of storage of data on the media (e.g., 512B block device) the count (C) field, the Key (K) field and the ECKD data (D) fields are recorded as previously described for the data during the transfer. There is no recalculation of the data protection trailer (T) during the transferring of the count (C), key (K), and/or data (D) fields. Also, this alignment process may be performed in the IU alignment unit in the server as described below in FIG. 10.

Figure 10:
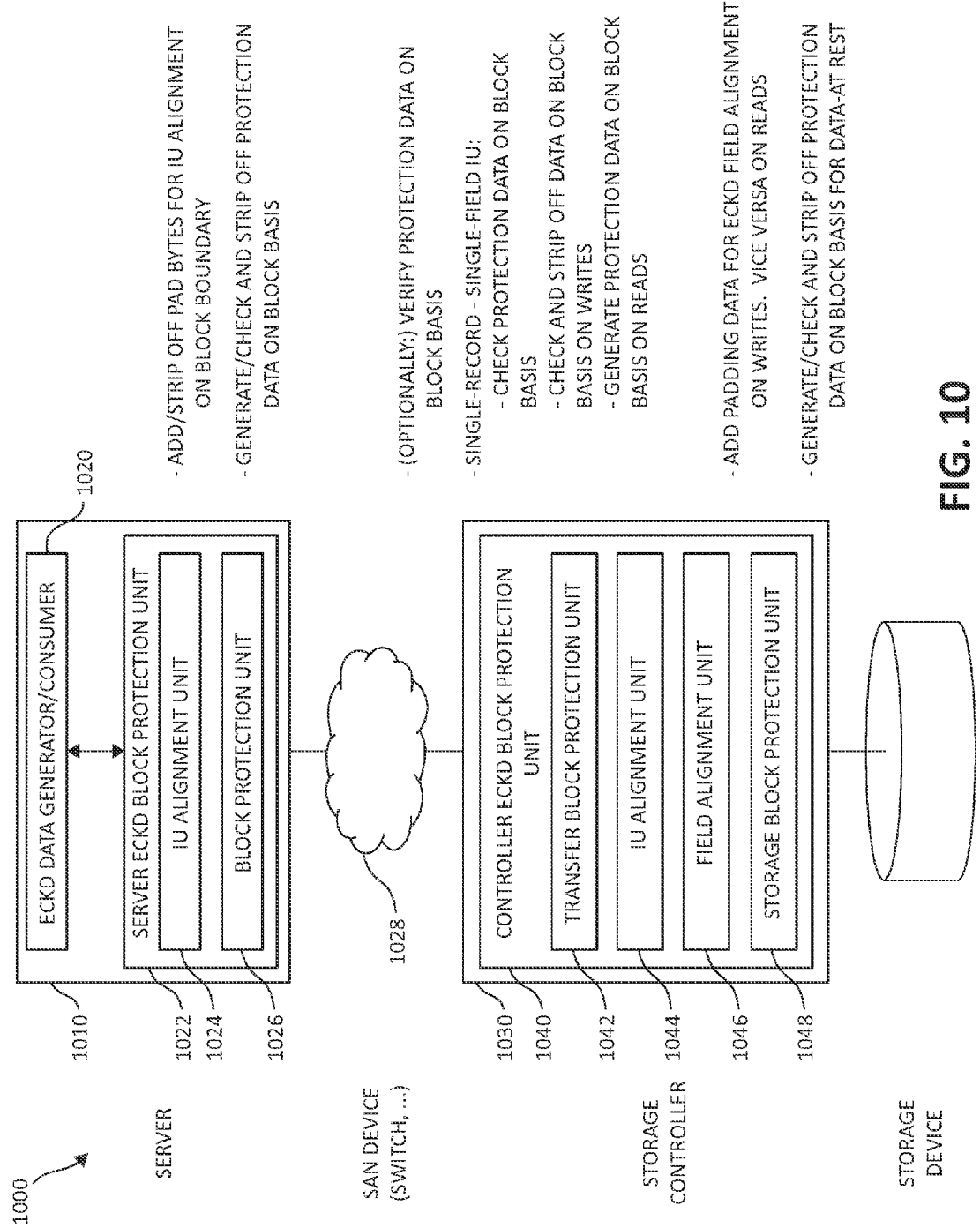
FIG. 10 illustrates an exemplary block diagram showing a hardware structure for transferring extended count key data (ECKD) based upon the first implementation for aligning the ECKD data.

Turning to FIG. 10, FIG. 10 illustrates an exemplary block diagram 1000 showing hardware structure for transferring extended count key data (ECKD) based upon the first implementation for aligning the ECKD data. FIG. 10 shows a server 1010, with an ECKD Data Generator/Consumer 1020 in communication with a server ECKD Block Protection Unit 1022. Within the server ECKD Block Protection Unit 1022, an Information Unit (IU) alignment unit 1024 and a block protection unit 1026 is depicted. The IU alignment unit 1024 may perform the functions and operations as previously described in FIG. 8. Moreover, the server (host side) may align the IU's. The IU alignment unit 1024 may add/strip off the padding bytes for IU alignment on block boundary. The block protection unit 1026 may generate, check (verify) and strip off the data protection trailer on block basis, (e.g., the T10 DIF data protection trailer). The server 1010 may be in communication with a storage area network (SAN) device (e.g., switch) 1028. The switch 1028 may be connected to a storage controller 1030 to allow communication from the host (e.g., server) 1010 to the storage controller 1030. Within the storage controller, a controller ECKD block protection unit 1040 is depicted. The controller ECKD block protection unit 1040 contains a transfer block protection unit 1042, an IU alignment unit 1044, a field alignment unit 1046, and a storage block protection unit 1048. The components of the storage controller 1030 may work in conjunction with each other and operate as if they are one entire unit, or they may function separately to perform the purposes of the invention. The transfer block protection unit 1042 may verify (in case of a write operation) or generate (in case of a read operation) the data protection trailer (e.g., the T10 DIF protection data) used for the transmission. The IU alignment unit 1044, which in case of a write operation removes the IU alignment and instead performs a field alignment (e.g., performs the field alignment on the storage controller) because in one IU there may be multiple fields that do not end on block boundary, and in case of a read operation removes the field alignment and adds alignment on an IU basis. If there are single records/single fields, the data protection trailer is checked and verified on a block basis. If multiple records/fields, the protection data (e.g., T10 DIF fields) may be checked (verified) and stripped off on a block basis for write operations. For a read operation, the protection data (e.g., T10 DIF protection data) may be generated on a block basis. The padding data may be removed for IU alignment. Padding data may be added for ECKD field alignment on read/write operations. The protection data (e.g., T10 DIF protection data) may be checked (verified) and stripped off on block basis for data-at-rest.

Figure 11:
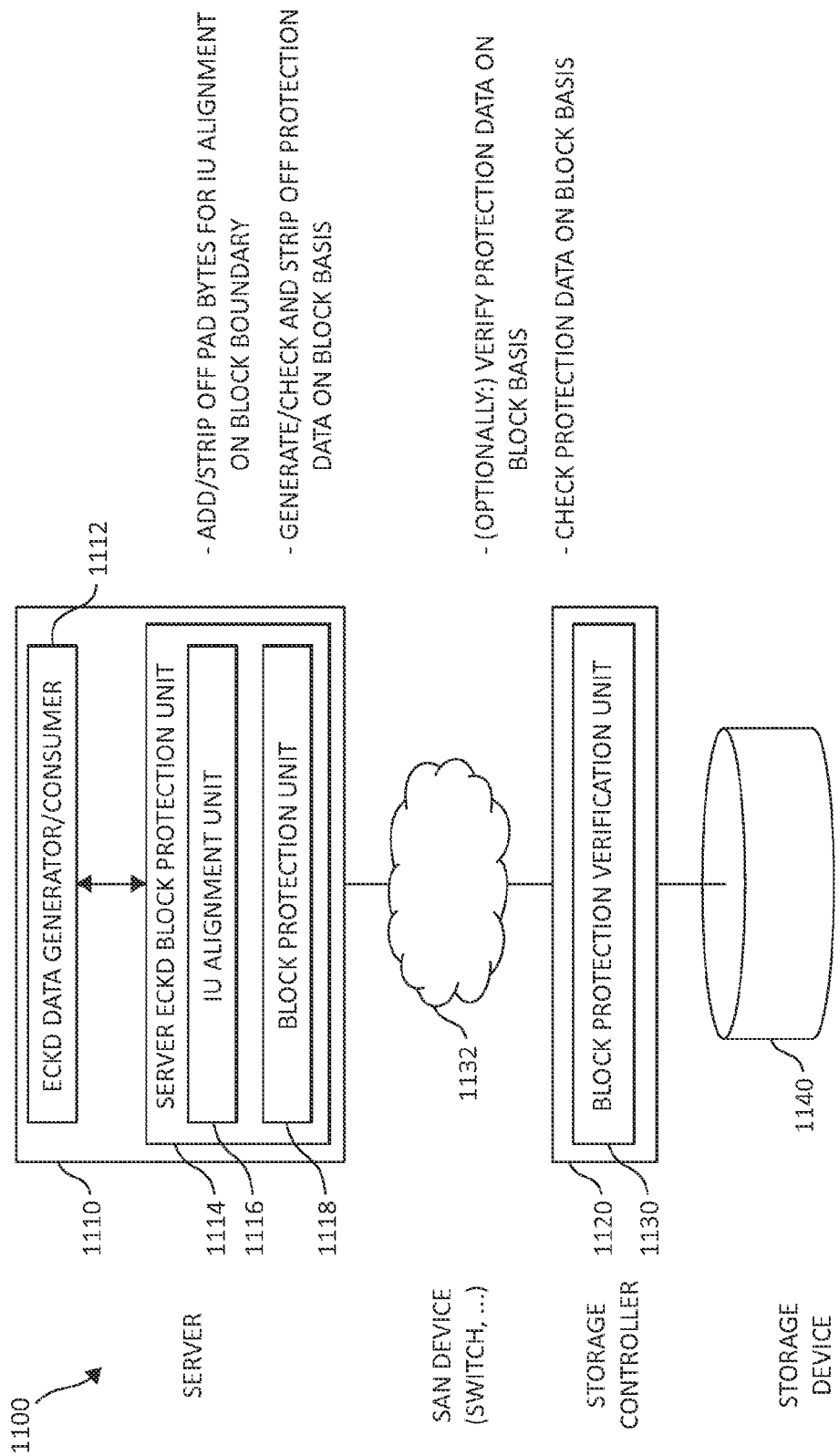
FIG. 11 illustrates an exemplary block diagram showing a hardware structure for transferring extended count key data (ECKD) based upon the second implementation for aligning the ECKD data.

FIG. 11 illustrates an exemplary block diagram 1100 showing hardware structure for transferring extended count key data (ECKD) based upon the second implementation for aligning the ECKD data. FIG. 11 shows a server 1110, with an ECKD Data generator/consumer 1112 in communication with a server ECKD block protection unit 1114. Within the server ECKD block protection unit 1114, a field alignment unit 1116 and a block protection unit 1118 is depicted. The field alignment may be performed on the host side. The padding data (e.g., pad bytes) may be added and/or stripped off for the ECKD field alignment on block boundary. The block protection unit 1118 may generate, check (verify) and strip off the data protection trailer on block basis. (e.g., the T10 DIF protection data). The server 1110 may be in communication with a SAN device (e.g., Switch) 1132. The SAN device 1132 may be connected to a storage controller 1120 to allow communication from the host (e.g., server 1110) to the storage controller 1120. Within the storage controller 1120, a block protection verification unit 1130 may verify the protection (fields) data (e.g., the T10 DIF protection data) used for the transmission and write and/or read the data unmodified and/or unchanged to the storage device 1140.

Figure 12:
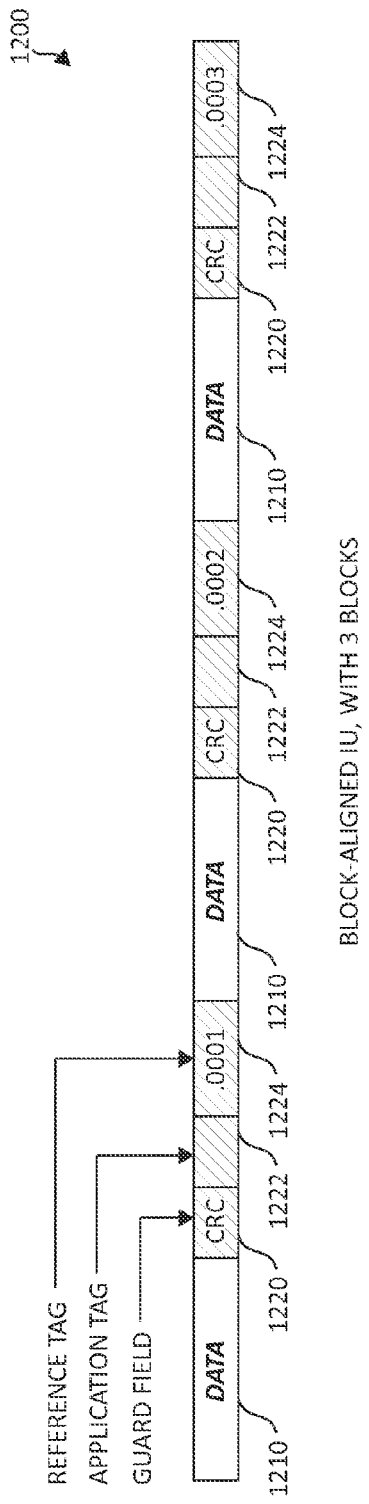
FIG. 12 illustrates an exemplary block diagram showing reference tags for protection against lost and/or misplaced blocks with the first or second implementation.

As mentioned previously, the mechanisms of the present invention provide protection against lost and/or misplaced blocks. FIG. 12 illustrates an exemplary block diagram 1200 showing reference tags for protection against lost and/or misplaced blocks within the first or second implementation. The data protection trailer (e.g., T10 DIF protection data) may contain a reference tag field 1224 used to carry a sequence number or the low order 32-bit of the logical block address (LBA) to provide protection against misplacement. In case of ECKD data, the LBA may not be known on the server side, therefore, a 4-byte reference tag 1224 may be used as an alternative to carry a relative sequence number of a data block with an IU. This 4-byte reference tag 1224 may be used to protect against rearranged blocks and/or lost/duplicate blocks, which do not change the length of the IU. This is the most critical case, because problems that cause the length of an IU to change can easily be detected, as length indicators are contained in IU headers as well as in packet headers used by lower Fibre Channel protocol layers. FIG. 12 depicts three blocks, each with a data area 1210, which may contain one or more ECKD fields, or pieces of such fields, possibly with padding data, and a data protection trailer consisting of a guard field (CRC) 1220, an application tag 1222, and the reference tag 1224 sequentially added to the data area 1210 of each block. The three blocks with their data areas and associated data protection trailers constitute a block-aligned IU.

Figure 13:
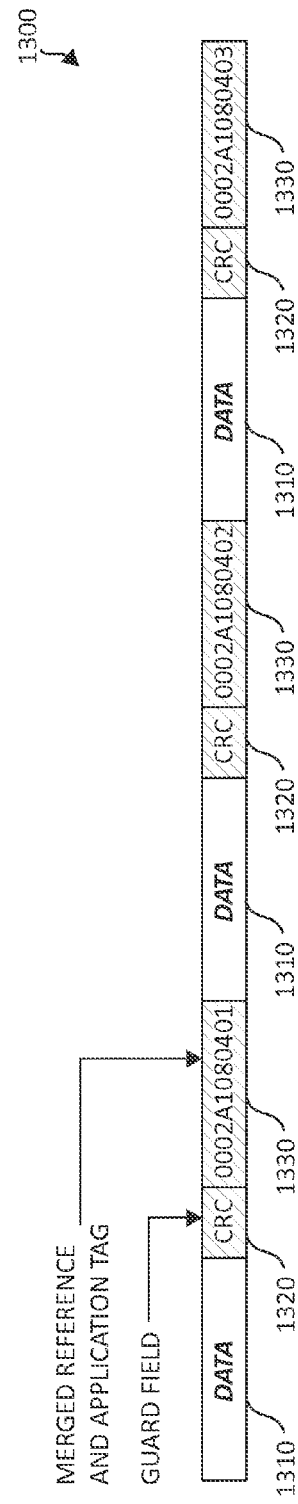
FIG. 13 illustrates an exemplary block diagram showing reference tags for protection against lost and/or misplaced blocks with the second implementation.

FIG. 13 illustrates an exemplary block diagram 1300 showing reference tags for protection against lost and/or misplaced blocks with the second implementation. To protect against lost and/or misplaced blocks during the second implementation, each ECKD record of a logical volume may be uniquely identified by a 5-byte record identifier cylinder-head-record CCHHR, the CCHH may be the track number and the R may be the record number relative to the start of this track. When mapped to 512-byte blocks, each ECKD record is typically mapped to a maximum of 112 blocks. Thus, the CCHHR may be expanded by one byte containing a 7-bit relative block number (B) (plus one reserved bit) to identify each 520-byte block of a record. The composite 6-byte CCHHRB number may be stored in the joint reference and application tag field 1330 of each protection data trailer (e.g., the T10 DIF trailer). Alternatively, a 4-byte hash value of CCHHRB may be stored in the Reference tag field, leaving the application tag field aside for other use. FIG. 13 illustrates three blocks, each containing a data field 1310, a guard field (CRC) 1320 and an application tag merged with a reference tag 1330 that is sequentially added to each data field 1310. The three blocks with their data areas and associated data protection trailers constitute a block-aligned IU with the data to be stored on (or read from) the first 3 blocks of track 0002 A108, Record 4.

Figure 14:
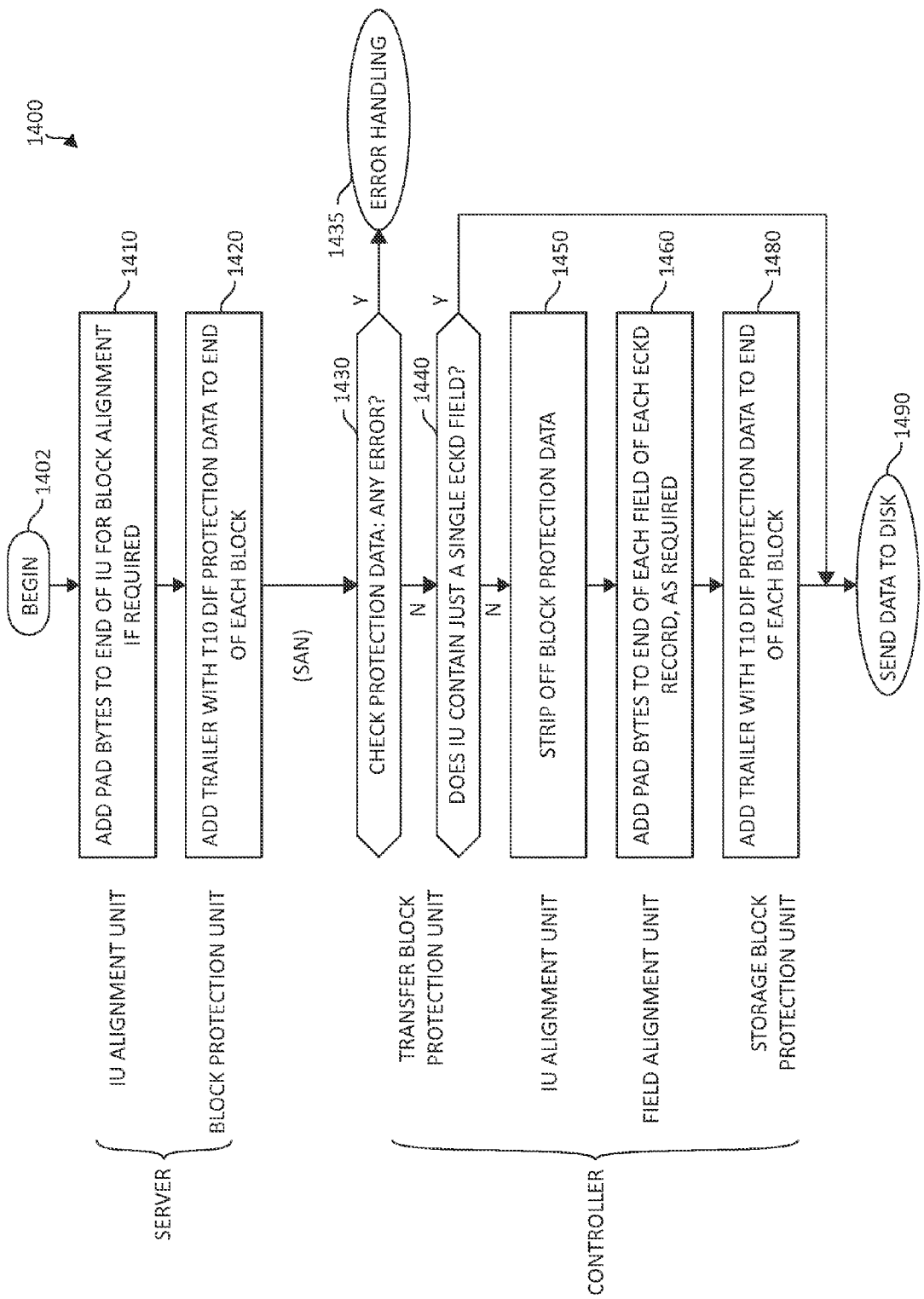
FIG. 14 is a flowchart illustrating an exemplary method for performing a write operation of the extended count key data (ECKD) with the first implementation.

FIG. 14 is a flowchart illustrating an exemplary method 1400 for performing a write operation of the extended count key data (ECKD) with the first implementation. In one embodiment, the method 1400 may utilize the hardware components as depicted in FIG. 10. The method 1400 begins 1402, with an IU alignment unit (as illustrated in FIG. 10 in the server) adding the padding byte to the end of the IU for block alignment, if necessary (step 1410). The block protection unit (as illustrated in FIG. 10 in the server) may add a trailer with protection data (e.g., T10 DIF protection data) to the end of each block (step 1420). At this point the data may be transferred via a storage area network (SAN). Upon receipt of the transferred data, the transfer block protection unit (as illustrated in FIG. 10 in the storage controller) checks the protection data to determine if there are any errors (step 1430). If yes, an error is signaled and sent to an error handler (step 1435). The host (server) may be notified of the error and the data may not be stored. If there are no errors, the transfer block protection unit may determine if the IU contains only a single ECKD field (step 1440). If yes, the method 1400 will send the data to a disk (e.g., storage disk) (step 1490). If there are multiple fields and/or multiple records, the IU alignment unit (as illustrated in FIG. 10 in the storage controller) may strip off the block protection data (step 1450). The field alignment unit (as illustrated in FIG. 10 in the storage controller) may add padding bytes to the end of each field of each ECKD record, as required and necessary (step 1460). The storage block protection unit (as illustrated in FIG. 10 in the storage controller) may add a trailer with protection data (e.g., T10 DIF protection data) to the end of each block (step 1480). The data is then sent to a disk (e.g., storage disk) (step 1490).

Figure 15:
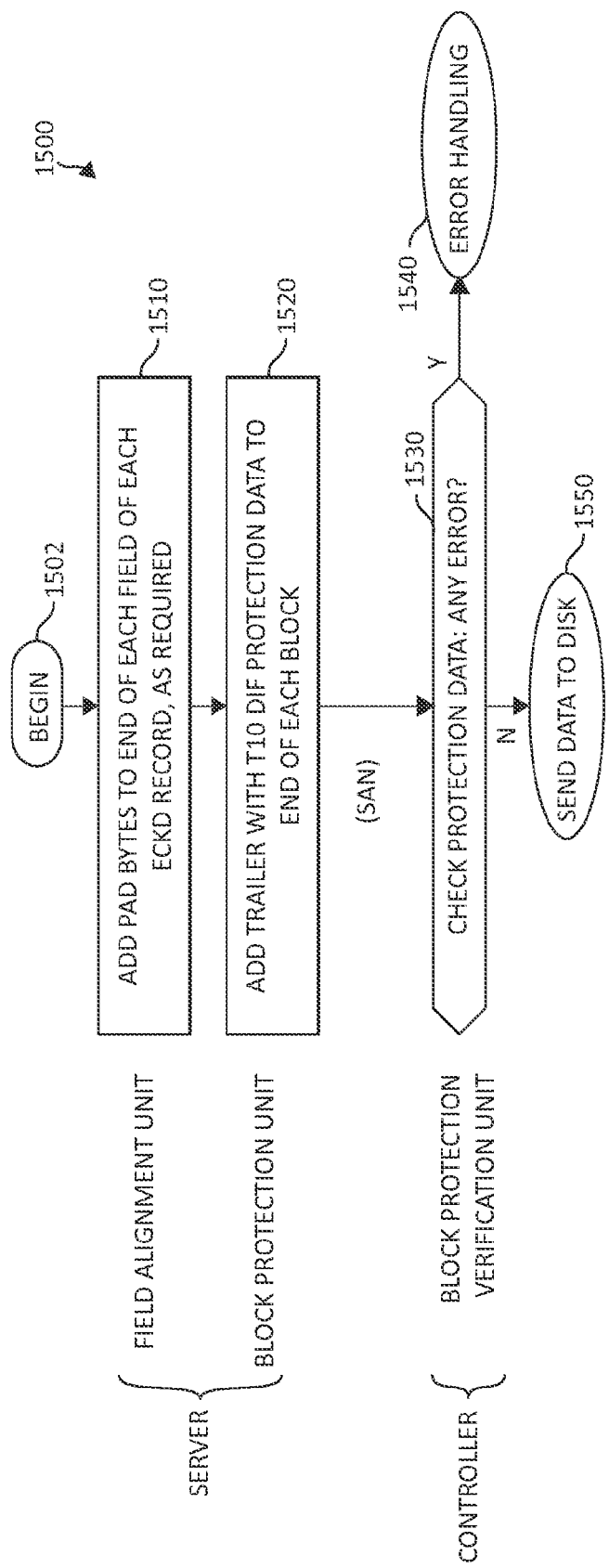
FIG. 15 is a flowchart illustrating an exemplary method for performing a write operation of the extended count key data (ECKD) with the second implementation.

FIG. 15 is a flowchart illustrating an exemplary method 1500 for performing a write operation of the extended count key data (ECKD) with the second implementation. In one embodiment, the method 1500 may utilize the hardware components as depicted in FIG. 11. The method 1500 begins 1502, with an IU alignment unit (as illustrated in FIG. 11 in the server) adding the padding bytes to the end of each field of each ECKD record, as necessary (step 1510). The block protection unit (as illustrated in FIG. 11 in the server) may add a trailer with protection data (e.g., T10 DIF protection data) to the end of each block (step 1520). The data is then transferred to the storage controller. The block protection verification unit (as illustrated in FIG. 11 in the storage controller) will verify and check the protection data to determine if there are any errors (step 1530). If yes, an error is signaled and sent to the host for error handling (step 1540). If there are no errors, the data is sent to the disk (step 1550).

Figure 16A:
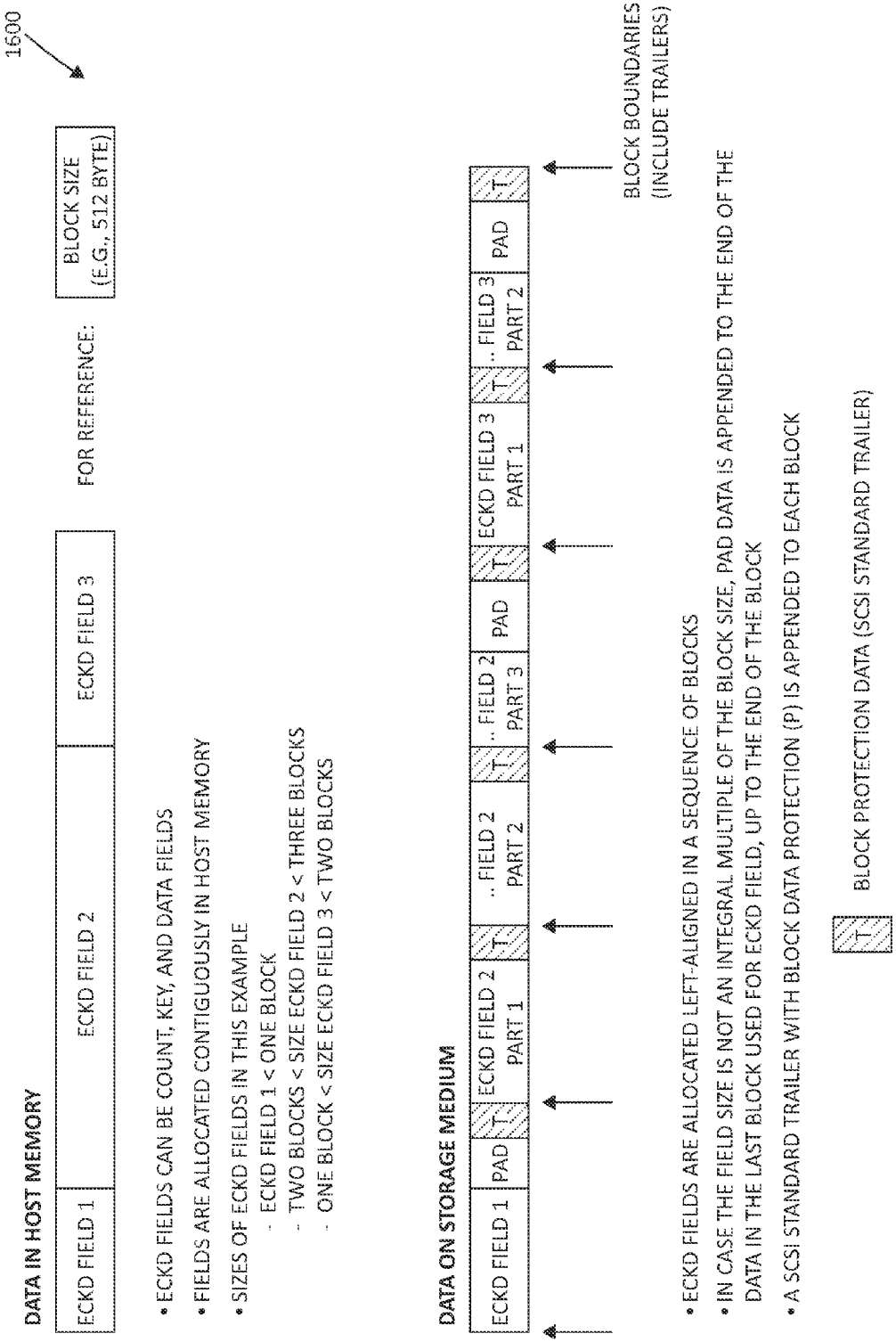
FIG. 16A illustrates an exemplary block diagram showing the alignment of extended count key data (ECKD) in a host memory and storage medium.
Figure 16B:
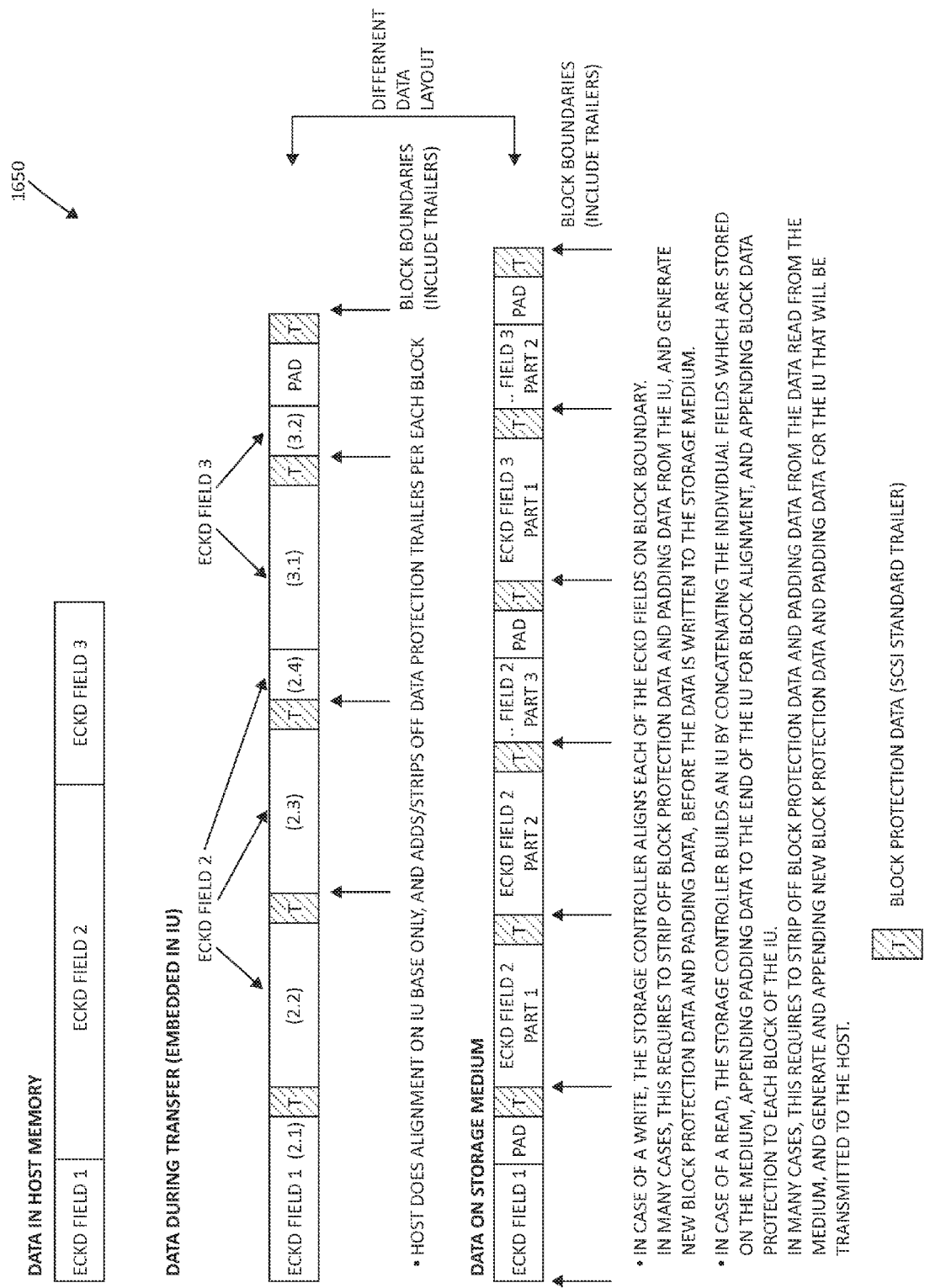
FIG. 16B illustrates an exemplary block diagram showing the alignment for transfer of extended count key data (ECKD) performed only on a IU based upon the first implementation.
Figure 16C:
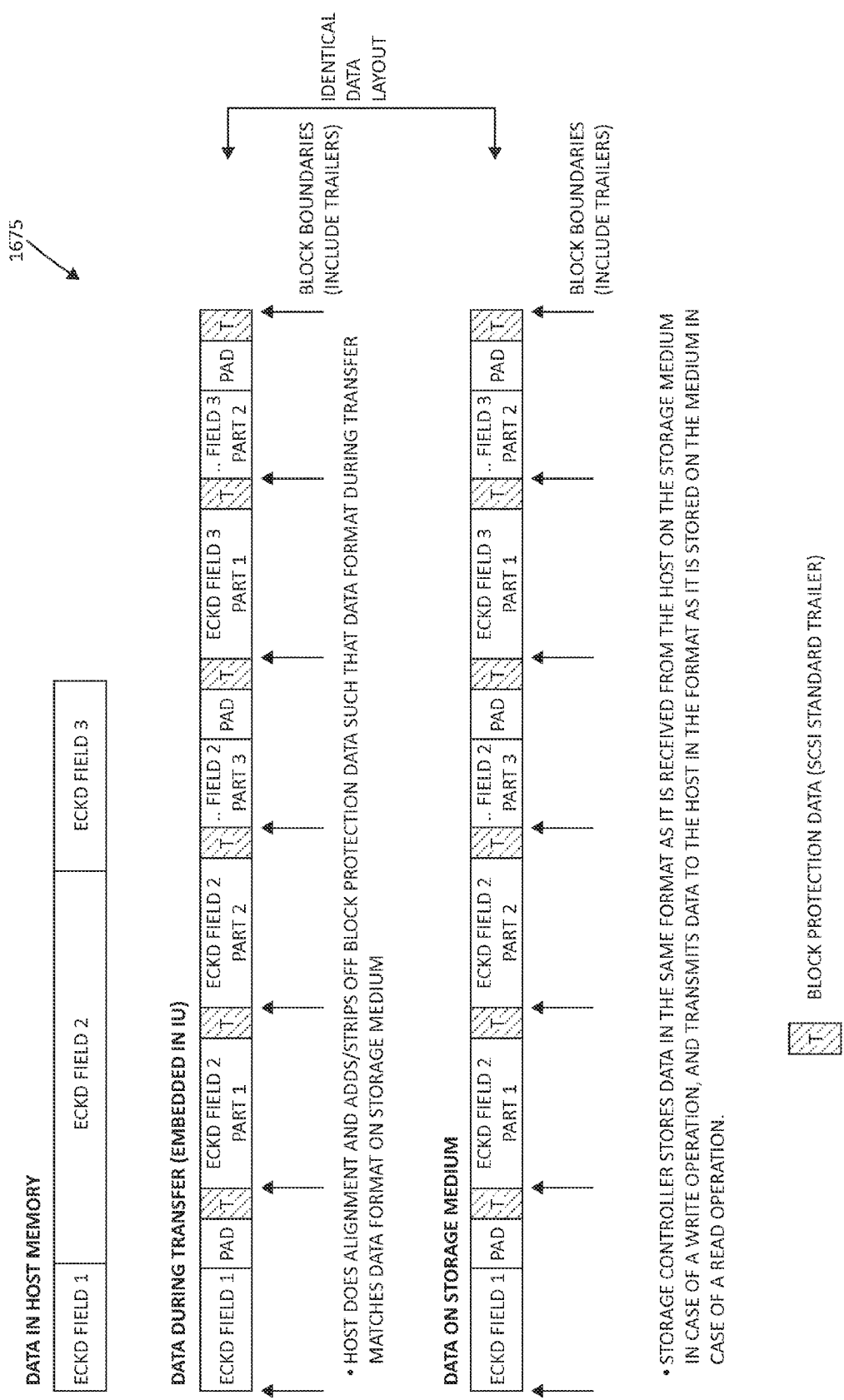
FIG. 16C illustrates an exemplary block diagram showing the alignment for transfer of extended count key data (ECKD) based upon the second implementation.

To further explain and provide a foundational understanding of the layout and alignments, FIG. 16A-C are exemplary block diagrams depicting introductory layouts of the ECKD data, with FIG. 16A showing the layout of the data in host memory and on the storage medium, and FIG. 16B and FIG. 16C also showing the layout in the host memory along with the structural layout of the ECKD data during transfer (e.g., as part of the embedded IU's), and on the storage medium. By way of example only and to better explain the flow charts of FIG. 3A-B and 4A-B, these figures do not distinguish between the different types of ECKD fields (count, key, and data) in the drawings. FIG. 16A illustrates an exemplary block diagram 1600 showing the alignment of extended count key data (ECKD) in a host memory and storage medium. FIG. 16A depicts three ECKD fields in both the host memory and the storage medium. The ECKD fields may be count, key, and data fields. The fields may be allocated contiguously in the host memory. The size of the ECKD field sizes may vary; for example, ECKD field 1 may be less than the size of one block. The size of ECKD field 2 may be greater than two blocks but less than three blocks. The size for ECKD field 3 may be greater than one block but less than two blocks. A block size may be a variety of sizes (e.g., 512 bytes plus data protection trailer).

With respect to the data on the storage medium, the ECKD fields may be allocated left-aligned in a sequence of blocks. In case the field size is not an integral multiple of the block size, pad data (indicated as "Pad" may be appended to the end of the data in the last block used for the ECKD field, up to the end of that block. A SCSI standard trailer with block data protection (T) may be appended to each block. Thus, as depicted in FIG. 16A, the ECKD fields (e.g., ECKD fields 1, 2 and 3) may also have a part 1, part 2, and a part 3.

FIG. 16B illustrates an exemplary block diagram 1650 showing the alignment for transfer of extended count key data (ECKD) performed only on a IU based upon the first implementation. FIG. 16B depicts three ECKD Fields in both the host memory and the storage medium. The ECKD fields may be count, key, and data fields. The fields may be allocated contiguously in the host memory. During the data transfer (embedded in the IU's) the host may perform an alignment on IU base only and add and/or strip off the data protection trailers per each block. The data during transfer illustrates the three ECKD fields, with block protection data and/or padding data that has been added along with the position. The fields may have part 1, part 2, and a part 3 (e.g., ECKD field shows (2, 2) as field 2 and part 2 in the data during transfer section or it is just labeled as part 1, part 2, and/or part 3).

Relating to the data on storage medium, in case of a write, the storage controller aligns each of the ECKD fields on block boundary. In some situations, it is required to strip off block protection data and padding data from the IU and generate new block protection data and padding data before the data is written to the storage medium. In the event of a read request, the storage controller may build an IU by concatenating the individual fields, which may be stored on the medium, appending padding data to the end of the IU for block alignment, and appending block data protection to each block of the IU. In many cases, this requires to strip off block protection data and padding data from the data received from the storage medium, and generate and append new block protection data and padding data for the IU that will be transmitted to the host. The "T" represents the block protection data and the "PAD" represents the padding data in FIG. 16.

FIG. 16C illustrates an exemplary block diagram 1675 showing the alignment for transfer of extended count key data (ECKD) based upon the second implementation. FIG. 16C depicts three ECKD fields in both the host memory and the storage medium. The ECKD fields may be count, key, and data fields. The fields may be allocated contiguously in the host memory. During the data transfer (embedded in the IU's) the host may perform an alignment of each individual ECKD field and add and/or strip off the data protection trailers per each block. The data during transfer illustrates the three ECKD fields, with block protection data and/or padding data that has been added along with the position. The host may perform the alignment and add/strip off block protection data such that the data format during transfer matches the data format on the storage medium. Relating to the data on storage medium, the storage controller stores the data in the same format as it is received from the host on the storage medium in case of a write operation and transmits the data to the host in the same format, as it is stored on the medium in case of a read operation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for block based end-to-end data protection for extended count key data (ECKD) by a processor device in a computing storage environment, the method comprising:
    aligning at least one of a plurality of information units (IU's) in a block boundary format; and
    adding block protection trailer data to each one of a block of the at least one of the plurality of IU's.

2. The method of claim 1, further including adding padding data to the at least one of the plurality of IU's.

3. The method of claim 1, further including performing at least one of:
    aligning at least one of a plurality of fields of the ECKD of the at least one of the plurality of IU's into the block boundary format,
    adding padding data to the at least one of the plurality of fields of the ECKD, and
    adding the block protection trailer data to each one of a block of the at least one of the plurality of fields of the ECKD.

4. The method of claim 1, further including performing at least one of:
    verifying the block protection trailer data on each one of the block of the at least one of the plurality of IU's,
    stripping off the block protection trailer data on each one of the block of the at least one of the plurality of IU's, and
    placing an alternative one of the block protection trailer data on each one of the block of the at least one of the plurality of IU's.

5. The method of claim 1, wherein the block protection trailer data added to each one of the block of the at least one of the plurality of IU's for at least one of a plurality of fields of the ECKD is the same for both one of data-in-flight and data at rest.

6. The method of claim 1, further including aligning control data of the at least one of the plurality of IU's in the block boundary format, adding padding data to the end of the control data, and adding the block protection trailer data to each one of a block of the control data.

7. The method of claim 1, further including adding a reference tag field to the block protection trailer data, wherein the reference tag field protects against the at least one of the plurality of IU's from being one of lost, duplicated, and misplaced.

8. The method of claim 7, further including, in response to adding the reference tag field to the block protection data, performing one of:
    using the reference tag field for one of carrying a sequence number for protection against misplacement of the block trailer protection data,
    providing an ECKD record identification, and
    using a four byte hash code in the reference tag field to protect against one of rearranged, lost, and duplicated blocks.

9. The method of claim 1, further including performing one of:
    sending at least one request with the at least one of the plurality of IU's to a storage controller, the at least one request is at least one of a write request and a read request,
    in response to receiving the at least one request by the storage controller:
        storing the at least one of the plurality of IU's on a storage device for the write request, and translating the at least one of the plurality of IU's into a sequence of the at least one of the plurality of IU's for the read request, the block protection trailer data added to each one of a block of each of the sequence of the at least one of the plurality of IU's, and reassembling data in the plurality of IU's into the ECKD.

\* \* \* \* \*